United States Patent [19]

Cline et al.

[11] Patent Number: 4,710,876
[45] Date of Patent: Dec. 1, 1987

[54] SYSTEM AND METHOD FOR THE DISPLAY OF SURFACE STRUCTURES CONTAINED WITHIN THE INTERIOR REGION OF A SOLID BODY

[75] Inventors: Harvey E. Cline, Schenectady; William E. Lorensen, Ballston Lake, both of N.Y.

[73] Assignee: General Electric Company, Schenectady, N.Y.

[21] Appl. No.: 741,390

[22] Filed: Jun. 5, 1985

[51] Int. Cl.$^4$ .............................................. G06F 15/42
[52] U.S. Cl. ..................................... 364/414; 340/728; 340/727; 340/747; 364/521
[58] Field of Search ............................ 364/414, 521; 382/44–47; 340/727–729, 706, 747

[56] References Cited

U.S. PATENT DOCUMENTS

| | | | |
|---|---|---|---|
| 3,889,107 | 6/1975 | Sutherland | 340/747 |
| 4,436,748 | 2/1984 | Tuhro | 340/728 |
| 4,471,349 | 9/1984 | Strolle | 340/728 |
| 4,475,104 | 10/1984 | Shen | 340/729 |
| 4,594,673 | 6/1986 | Holly | 340/729 |
| 4,612,546 | 9/1986 | Pratt | 340/728 |

OTHER PUBLICATIONS

"Anti-Aliasing Video Lookup Table", IBM Tech. Disclosure Bulletin; vol. 27 No. 10B, Mar. 1985.
"Elimination of Staircasing in Raster Display"; IBM Tech. Disclos. Bulletin; vol. 18, No. 9, pp. 3077–3078; Feb. 76.
Machover, C, and Myers, W., "Interactive Computer Graphics" Computer Magazine, IEEE Computer Society Publication, (Oct. 1984), pp. 145–161.
Artzy, Ehud et al., "The Theory, Design, Implementation and Evaluation of a Three-Dimensional Surface Detection. Algorithm", *Computer Graphics and Image Processing*, vol. 15, (1981) pp. 1–24.

*Primary Examiner*—Jerry Smith
*Assistant Examiner*—Gail Hayes
*Attorney, Agent, or Firm*—Lawrence D. Cutter; James C. Davis, Jr.; Marvin Snyder

[57] ABSTRACT

A method and apparatus for displaying three dimensional surface images includes the utilization of a case table for rapid retrieval of surface approximation information. Eight cubically adjacent data points associated with a given voxel element are compared with a predetermined threshold value or range to generate an eight bit vector. This eight bit vector is employed to rapidly produce vector lists of approximating surfaces. An interpolation operation is performed so as to more closely approximate the desired surface and to provide more accurate representations of vectors normal to the desired surface. The accurate representation of these normal directions provides means for accurately representing shading information on a display screen. The method and apparatus of the present invention are particularly useful for the display of medical images both, from x-ray generated data and from data generated from various other sources including magnetic resonance imaging and positron emission tomography. The present invention provides a means for rapid generation of three dimensional images so as to enable interactive use by medical practitioners.

16 Claims, 55 Drawing Figures

VERTEX LABELS

EDGE LABELS

CASE 1

CASE 1

CASE 2

CASE 2

CASE 3

CASE 3

CASE 4

CASE 4

CASE 5

CASE 5

CASE 6

CASE 6

CASE 7

CASE 7

CASE 8

CASE 8

CASE 9

CASE 9

CASE 10

CASE 10

CASE 11

(TRIANGLE 3,11,5 NOT VISIBLE)

CASE 11

CASE 12

CASE 12

CASE 13

CASE 13

CASE 14
(V4 HIDDEN)

(TRIANGLE 7, 12, 4 NOT VISIBLE)

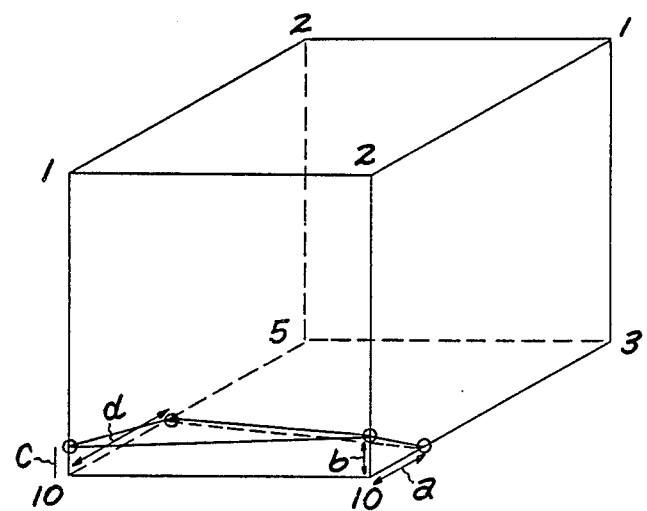

SYSTEM AND METHOD FOR THE DISPLAY OF SURFACE STRUCTURES CONTAINED WITHIN THE INTERIOR REGION OF A SOLID BODY

BACKGROUND OF THE INVENTION

The present invention is generally directed to a system and method for displaying surface information. The images of the surfaces displayed are typically contained within the interior regions of solid bodies which are examined by computed axial tomographic (CAT) x-ray systems or by nuclear magnetic resonance (NMR) imaging systems either of which is capable of generating three dimensional arrays of data representative of one or more physical properties at various locations within a three dimensional volume. More particularly, the present invention is directed to a system and method for the display of medical images so as to obtain images and representations of internal bodily structures. The images generated in the practice of the present invention provide three dimensional data for examination by physicians, radiologists, and other medical practitioners. The present application has been filed concurrently with application Ser. No. 741,391.

In conventional x-ray systems, a two dimensional shadow image is created based upon the different x-ray absorption characteristics of bone and soft tissues. A great improvement on the conventional x-ray system as a diagnostic tool was provided by the computed axial tomographic systems which have been developed over the last ten years or so. These so-called CAT systems are x-ray based and initially were used to produce single two dimensional views depicting transverse slices of a body, object, or patient being investigated. Three dimensional information was thereafter gleaned from CAT scan data by generating data for a number of contigous slices and using the inferential abilities of the radiologist to suggest a three dimensional representation for the various internal organs. In one embodiment of the present invention, shaded and contoured three dimensional images are generated from the three dimensional array of data generated by a sequence of such contiguous CAT scans. In the same way, the newer NMR imaging technology is also capable of generating three dimensional arrays of data representing physical properties of interior bodily organs. Moreover, NMR systems have the capability to better discriminate between various tissue types, not just bone and soft tissue. NMR imaging systems are also capable of generating physiological data rather than just image data. However, whether NMR or CAT systems are employed, the data has been made available only as a sequence of slices and systems have not generally been available which provide true three dimensional images.

In the present invention, three dimensional data generated either by a CAT scanning system or by an NMR imaging system may be displayed and analyzed in a plurality of ways so as to produce on a display screen or other device a multitude of anatomical features which are selectable at the viewer's choice. In the system and method of the present invention, the data used to produce the three dimensional images is typically acquired once and then used and re-used to generate medical information and display images at the option of the viewer. The viewer is provided with the option of selecting one or more threshhold values which determine, for example, whether or not bone surfaces as opposed to brain surface tissue is to be displayed. The viewer or operator of the present system can also select the appropriate viewing angle and can, at will, selectively ignore segments of the data generated in order to provide cross sectional views through any desired plane. Moreover, the viewing angle is selectable and it is possible to generate a sequence of images and display them sectentially to provide the medical practitioner with interior views of solid surfaces in a truly three dimensional manner from any desired viewing angle with the further capability of being able to construct a view through any plane or slice. Again, it is pointed out that for many purposes, an almost infinite variety of meaningful images may be created from only a single set of NMR or CAT scan slice data arrays. Certainly though, if the objective of the medical investigation is the study of internal anatomic variations as a function of time, then it is meaningful to produce a sequence of three dimensional data arrays indexed by time. The system and method of the present invention provide the medical practitioner, and surgeons in particular, with the ability to plan detailed and complicated surgical procedures using totally non-invasive diagnostic methods. The images generated by the present invention can only be described as truly dramatic and show every evidence of being as great an improvement in the medical imaging arts as computed axial tomography and nuclear magnetic resonance imaging.

While the system and method of the present invention will undoubtedly find its greatest utilization in the analysis and display of tomographic x-ray and nuclear magnetic resonance imaging data, the system of the present invention is equally applicable to system employing ultrasound, positron emission tomography, ECT (emission computed tomography) and MMI (multimodality imaging). Moreover, while the present invention is particulary applicable to the construction of medical images, it is also pointed out that the system and method of the present invention is applicable to the display of interior three dimensional surface structures for any system which is capable of generating three dimensional data arrays in which signal patterns are present which represent the value of at least one physical property associated with points in a solid body.

A particular advantage of the present invention is its ability to provide the medical practitioner with the ability to perform interactive functions with the machine in real time. Systems which do not permit interactive use suffer a significant disadvantage since a real time display methodology is required for optimal human interaction with the system, particularly in the case of a surgeon planning a difficult procedure. For example, in transplant surgery, it is often difficult to ascertain beforehand the precise shape or size of a body cavity which is to receive the implant. This is true whether or not the implant comprises human tissue or a mechanical device. It is therefore seen that it would be very important for a surgeon to be able to display the cavity in question on a screen in three dimensional form and be able to rotate it and section it at will, before any invasive procedure is undertaken. It is also important to such medical practitioners that the images generated are sharp and exhibit excellent contrast. The images generated should also depict surface texture wherever this is possible.

The display of three dimensional graphic images on a cathode ray tube (CRT) screen has principally been driven by the goals and directions of computer aided design (CAD) and computer aided manufacture (CAM). Systems have been developed for displaying solid bodies and for manipulating images in desirable fashions to create solid models for manufactured parts and for rotating and viewing these parts from a multiplicity of directions. In particular, CAD/CAM systems have been developed which accept so called wire-frame data. In a wire-frame display format, the display processor is provided with a sequence or list of three dimensional points representative of the end points of line segments. These line segments are joined to represent various surfaces. An advantage of these wire frame images is the ability to rapidly rotate the image about various axes to obtain different views. This is actually a computationally burdensome task which has only recently been satisfactorily solved through the utilization of high speed, large scale integrated circuit devices. A wire-frame image, even one which has been processed to eliminate hidden lines, may typically comprise a list of 50,000 vectors which is displayed on a screen, each "vector" being a (directed) line segment drawn between two points by a CRT form of display device. More sophisticated graphics processing systems not only accept wire-frame data, but also perform functions such as hidden line removal and continuous shading in various colors and/or in various shades of gray. In such systems, the viewing angle is selected by the operator. In systems displaying shaded images, the normal vector to the surface being displayed varies from point to point on the surface and the shading is determined from this normal vector and the viewing angle. Thus, it is seen that the information provided by the normal vector is very important in the shading which is applied to what is in actuality a two dimensional CRT screen image. It is the shading of this image (based originally on wire-frame data) that creates a very effective illusion of three dimensions. It is the providing of these three dimensional clues (shading) to the human visual system which is achieved particularly well in the system of the present invention. The shading data is generally produced from wire-frame data in various graphics processing systems which operate to convert the vector format of wire-frame images to the so-called raster scan format. It is the raster scan format that is most familiar to the television viewer. In general, computer graphics display systems and display methodologies are divided into vector based systems which are particularly appropriate for line type drawings and raster format systems which produce images which are more closely related to that which is seen by the human eye.

Related work in the field of displaying three dimensional images has been carried out by Gabor Herman who has employed a method in which each adjacent volume element is analyzed and quantized to discrete zero and one values. Surface approximations are made only by considering cube faces and surface normal information can only be partially reconstructed because of the quantization step that is performed. The resulting method also is computationally long and produces low resolution images and appears to be slower than the present method for interactive use at this time.

Meagher, working for Phoenix Data Systems, has employed a method of octree coding in which the three dimensional data array is subdivided into eight regions and each region is subdivided until individual volume elements are formed. Regions not containing surfaces are not subdivided. However, this method requires special purpose hardware, while the images are crisp, individual volume elements produce a quantized artifact that is not observed in smooth tissues such as bone. Furthermore, octree encoding methods are incompatible with polygonal surface descriptions which are used in most of the advanced graphics display systems that have been developed for CAD/CAM technology. Other methods for displaying three dimensional data are, for example, described in U.S. Pat. No. 4,475,104 issued Oct. 2, 1984 in the name of Tsu Y. Shen. This patent appears to disclose a three dimensional display system which incorporates a depth buffer to provide separate 3D information as part of the mechanism for generating appropriate shading values.

Accordingly, it is seen that it is an object of the present invention to provide a system and method for the display of three dimensional information.

It is a further object of the present invention to provide a display system for use in conjunction with CAT scanners, ultrasound devices, NMR imaging systems, and any and all other systems capable of generating three dimensional data representative of one or more physical properties within a body to be studied.

It is yet another object of the present invention to provide a graphics system for medical images which is capable of interactive use and yet at the same time produces high quality images providing textural, shading, and other visual clues to the user.

It is yet another object of the present invention to provide a three dimensional graphics display system which is compatible with current CAD/CAM systems.

Another object of the present invention includes the ability to generate and display three dimensional wire frame information.

Still another object of the present invention is to maximize the information contained in a three dimensional data array for the purpose of surface representation.

It is also an object of the present invention to provide a system and method which is readily fabricatable in specialized electronic hardware including integrated circuit chips and read only memory (ROM) devices.

It is yet another object of the present invention to provide medical practitioners with the ability to emulate surgical procedures graphically prior to undertaking invasive measures.

Additionally, it is an object of the present invention to provide a plurality of three dimensional surface views from a single set of collected data.

Lastly, but not limited hereto, it is an object of the present invention to provide a system and method for display of three dimensional images of internal surface structures in such a way that the specific viewing angle and cross sectional viewing plane may be selected by the user in an interactive manner.

SUMMARY OF THE INVENTION

In accordance with a preferred embodiment of the present invention, a system for displaying three dimensional surface structures comprises means for storing three dimensional signal patterns which represent the value of at least one physical property which is associated with a three dimensional body at rectangularly spaced grid locations within a body. The system includes means for retrieving eight adjacent signal pattern values, these values being located at cubically adjacent grid locations. As used herein and in the appended claims, the term "cubically adjacent" refers to grid locations which exist at the eight corners or vertices of a cube, or more generally, a parallelopiped. The system also includes means for comparing each of these eight cubically adjacent values with a predetermined threshold value or range of values so as to generate an eight bit binary vector which is used herein as an addressing or generation mechanism. The system also includes means for generating a set of coordinate values for each of the distinct binary vectors generated. These coordinate values represent the vertices of at least one predetermined polygonal surface which approximates the intersection of surfaces determined by the threshhold value with the volume defined by the eight grid locations. In general, these coordinate values are also selected to be dependent upon the location of the eight grid points within the body. A preferred embodiment of the present invention further includes display processor means for receiving the coordinate values and for converting these coordinate values to a particular display format. The preferred embodiment also includes means for displaying surfaces determined by the threshhold, the display means being driven by the display processor.

In accordance with a preferred embodiment of the present invention, a method for producing three dimensional surface representations on a display device such as a CRT screen includes the steps of generating three dimensional signal patterns in which the signal patterns represent the values of at least one physical property associated with a three dimensional body at regularly spaced grid points throughout the body. These three dimensional signal patterns are employed to generate an eight bit vector for each set of cubically adjacent locations throughout the body. The vector is determined by comparison of data values representing the physical property with a predetermined threshold value or range of values. This eight bit vector is used to generate a set of coordinate values for each of the 256 distinct eight bit vectors. The coordinate values generated represent vertices of at least one predetermined polygonal surface which approximates the intersection of surfaces determined by the threshhold value with the volume defined by the eight grid locations. These coordinate values also depend upon the location of the grid location within the body. These coordinate values are supplied to a display processor and display device for a generation of three dimensional images of at least one surface within the body, this surface being determined by the threshold value or values.

In the display of three dimensional surface pictures, say for example, on a CRT screen, it is very important to provide visual clues to the human eye with respect to orientation of each part of the surface. These visual clues are provided by shading the various triangular or polygonal surface elements which are displayed. For example, the more closely the normal direction to the surface is to the viewer's line of sight, the lighter is the shading that is applied (at least for positive rather than negative images). Surface segments which exhibit normal directions with components directed away from the line of sight represent surface structures which are not visible and therefore these normal directions provide a mechanism for eliminating the surface element from the view for a particular viewing angle. Surface elements having normal vectors with substantial components in a direction orthonogal to the viewing direction are represented by more darkly shaded surface elements. As used herein, the term "surface element" refers to triangular, or more generally polygonal, surfaces which are used to tile or tesselate, the desired surface.

In the medical aspects of the present invention, a discriminating threshhold value or range may be chosen so as to selectively view various body structures. For example, if one wishes to view bony structures, a particular threshhold value is chosen. However, if one wishes to view the surface structures of softer tissue, a different threshhold value is selected by the operator. In any event, the system for displaying such three dimensional surface structures should include accurate means for determining local surface normal directions, since it is these directions which greatly enhance the ability of the viewer to recognize the shading clues for a truly three dimensional representation.

One of the significant features of the present invention is the ability to perform rapid generation of coordinate values representing polygonal and, in particular, triangular surfaces. These polygonal surfaces approximate the intersection of the desired surface with a three dimensional volume element. The eight values defined at the eight vertices of a three dimensional grid structure are employed to generate an eight bit vector. This vector is employed as an address to rapidly generate the coordinate values. In each voxel element (defined by the eight cubically adjacent grid points), the object is to define a surface which separates included from excluded vertices. In general, there are 256 cases which have to be analyzed for surface intersection arrangements. However, a significant observation of the present inventors has led to the conclusion that only 14 cases actually need to be constructed. The present inventors have determined that by rotation about any of three mutually perpendicular axes and by employing binary complementation methods, the 256 cases actually reduce to a mere 14 cases which require separate manual analysis (one additional trivial case requires no such analysis). Furthermore, the coordinate values may be readily obtained from an eight bit vector by means of a lookup table which is easily implemented in a read only memory (ROM). This method provides for rapid surface tesselation and offers two significant advantages. First, the vertices of the triangular or polygonal structures generated in the present invention, lie on the edges of cubical voxel grid patterns. This permits the use of interpolative methods for adjusting the position of the polygonal vertex along the cubical edge. This interpolation is done in accordance with the values occurring at each of the cubical vertices, which values may be treated as weights. This provides additional flexibility for more accurately approximating the desired surface to be viewed. Secondly, since the representational objects generated in the present invention comprise polygons and triangles, normals to these approximating surfaces are readily computed and may be provided directly to devices designed for accepting display data in this form. This additional ability to accurately portray surface and surface normal information in a rapid fashion provides the present invention with significant advantages. Not the least of these advantages is the fact that the polygonal format generated is compatible with advanced graphics workstations which are used to manipulate three dimensional surface data. It is also seen that the resolution of the images produced by the present invention are superior to previous methods since the signal information is interpolated, rather than quantized, to accurately determine surface position and normal direction. As pointed out above, it is the accurate portrayal of the surface and the surface normals which provide the essential clues for the visual perception of displayed images as three dimensional objects.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 4A'-4N' are plan views of the cube and surface structure shown in FIGS. 4A-4N, respectively;

FIG. 5 is a perspective view illustrating an interpolation method employable in the present invention;

DETAILED DESCRIPTION OF THE INVENTION

Figure 1:
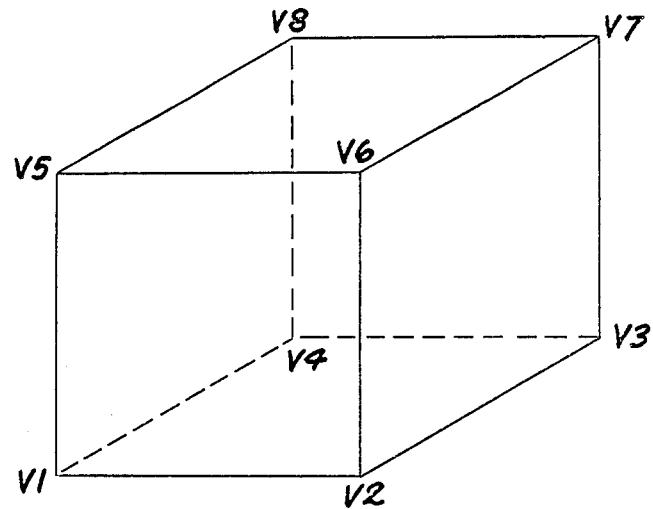
FIG. 1 is a perspective drawing illustrating a vertex labelling scheme associated with each voxel in a three dimensional array of data.
Figure 2:
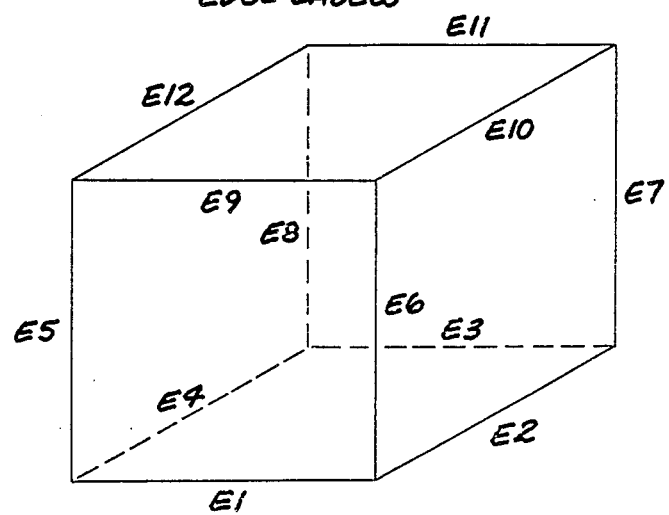
FIG. 2 is a perspective drawing illustrating an edge labelling scheme associated with each voxel element in a three dimensional array of data.

An understanding of the present invention can only be had by fully understanding the method of surface approximation employed. Likewise, this surface approximation method cannot be properly appreciated without analyzing the 14 cases illustrated in FIGS. 3 and 4. In order to understand the contents of these figures, one must first appreciate the vertex and edge labelling conventions employed. The vertex labelling scheme is illustrated in FIG. 1, which illustrates the labelling convention applied to eight cubical vertices, V1 through V8, as shown. Likewise, FIG. 2 illustrates the labelling of the 12 cubical edges. In FIG. 1, the set of vertices illustrated are, in accordance with the definition given above, describable as being cubically adjacent. However, since scaling in any of three distinct directions is possible, it is understood that such points may also lie on the corners of a rectangular parallelopiped. However, the illustrations herein have been directed to regular cubical structures for purposes of clarity. It is pointed out that the illustrations in FIGS. 1 and 2 have been drawn with edges E3, E4, and E8 being shown as dotted lines to reflect their presence at the rear of the structure, that is, they are illustrated as hidden lines. This is also true of FIGS. 3A-3N and 4A-4N. It is noted that other vertex and edge labelling arrangements could just as easily have been employed without departing from the principles of the present invention. It is nonetheless important, however, to employ consistent edge and vertex labelling schemes.

Before a detailed discussion of FIGS. 3 and 4 is undertaken, it is appropriate to point out several features which are common to all of these drawings. These drawings illustrate 14 cases that are included as part of the analysis made in the present invention. These 14 cases have been reduced from a total of 256 possible cases. In each of the figures being considered, vertices are shown as filled in circles. Edges are depicted by open circles lying at the midpoints of the edges. In FIGS. 4A-4N, a surface or set of surfaces is shown. Each of these surfaces is defined by a sequence of edge points. Likewise, each surface is designed to isolate one or more of the eight vertices. In one case, only a single vertex must be isolated. In other cases, two, three, or four vertex points are to be isolated by triangular or polygonal surface approximations. These surfaces are approximations to the intersection of the desired surface with the voxel element. It is of course, understood that the entire surface is to be reconstructed from a plurality of these individual surface elements. In FIGS. 4A'-4N' and in 4B", indications are given for a vector normal to the approximating surfaces shown. In most cases, this normal direction is illustrated by circulating arrow following the righthand rule convention. In each case illustrated, the normal direction has been selected to be directed away from the vertex which is being isolated by the surface. In at least one case, because of the orientation of the polygons generated, the surface normals themselves are visible (see FIG. 4J').

Attention is now directed to analyzing several examples of the polygonal surfaces generated in accordance with the system and method of the present invention. These polygonal surfaces are generated in response to the production of an eight bit binary vector based upon data comparisons made at each set of eight cubically adjacent grid locations within the body being investigated.

Figure 3A:
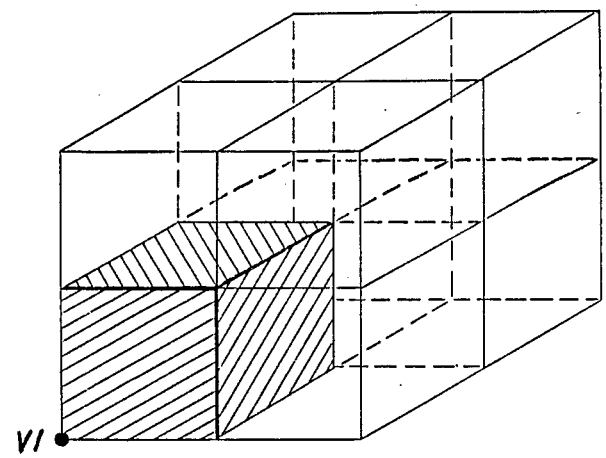
FIGS. 3A-3N are perspective illustrations included for the purpose of demonstrating the fact that all 256 intersection cases are reducable to only 14 distinct cases.
Figure 4A:
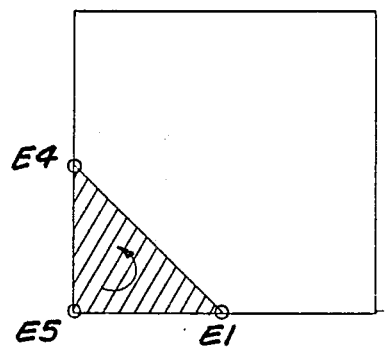
FIGS. 4A-4N are perspective illustrations which show the specific polygon or triangle employed for each one of the 14 cases.
Figure 4A:
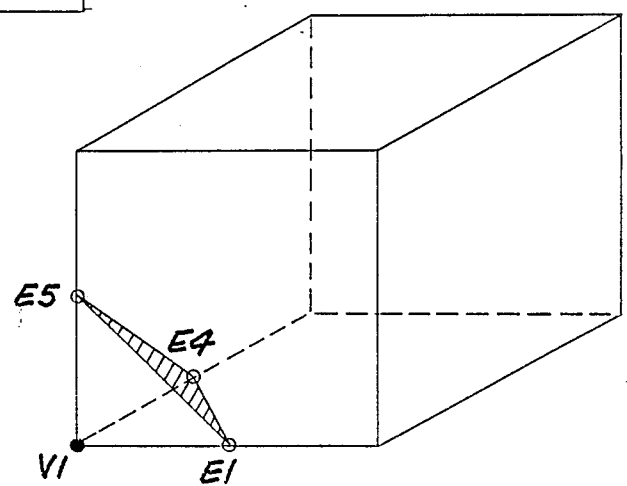

Attention is now specifically directed to case 1 as illustrated in FIGS. 3A, 4A, and 4A'. FIG. 3A illustrates the case in which a single vertex is present at one of the eight vertex points of the cube. In FIG. 3A, vertex 1, or V1, is shown as being present. This corresponds to the situation in which data values associated with the eight vertex points have been compared with a threshhold value with the result that only one of the associated vertex values was found to be above (or below) a threshhold value. It is the threshhold value or range of values which serves to isolate the particular surface or surfaces within the three dimensional body being considered. For ease of appreciating the geometry, FIG. 3A shows a block in the corner associated with V1. For a proper understanding of the present invention, it should be appreciated that case 1 actually represents a plurality of subcases which are determined by rotation about various axes. For example, rotations about one or more orthogonal axes through an angle of 90°, can move the small, internal block of FIG. 3A into any desired corner of the cube. For example, rotation about a horizontal axis extending from the middle of the front face to the middle of the rear face of the cube shown can move the block from the V1 position to the V5 position and then from V5 position to the V6 position, and then from the V6 position to the V2 position, or in the corresponding opposite direction. Likewise, rotations about other selected axes are capable of producing a situation which differs from the case illustrated only in specific orientation and not in geometric structure. Likewise, case 1 also includes the complement situation in which vertices V2, V3, V4, V5, V6, V7, and V8 are turned "on" and in which V1 is turned "off". Thus, through rotational invariance and the use of complementary situations, it is appreciated that case 1 actually stands for 16 subcases (8 rotational invariances and their corresponding 8 complement cases).

One of the objects of the present invention is to generate polygonal surfaces which represent surface approximations. Consideration then is given to the nature of the surface which intersects the voxel shown in such a manner that vertices on one side of the surface exhibit data values greater than a specified threshhold, and vertices on the opposite side of the surface, represent vertices with data values less than the selected threshhold value. While it is exceedingly tedious to generate an answer for each of the $256 = 2^8$ possibilities (8 being the number of vertices), it can nonetheless be appreciated that rotational and complementary cases can act to reduce this number. In fact, a reduction from 256 subcases to a mere 14 principle cases is possible and is illustrated herein in the figures which follow.

For the particular situation found in case 1, a triangular surface is selected as most closely representing the desired surface. This triangle is specified by the triplet of numbers 1,4,5 representing, in sequence, edge E1, edge E4, and edge E5. Once one knows the location of the particular cubical voxel element containing these edges and vertices, it is seen that it is immediately possible to generate appropriate coordinate values for these edge points. These values may be provided in an integer format or in a floating point format, or in any other format suitable for computational purposes. It is also, of course, preferable that the format chosen match the capabilities and characteristics of various display processors usable in the present invention. Thus, a binary number such as 0 0 0 0 0 0 0 1 representing the presence of vertex V1 is employable as an address or index vector as a means for addressing, accessing, or generating the number triplet representing edges E1, E4, and E5.

As indicated above, surface normal directions are important in the practice of the present invention. Accordingly, it is also desirable to be able to assign a surface normal direction associated with the triangular area shown in FIG. 4A. For this purpose, attention is directed to FIG. 4A' which is a plan view of FIG. 4A. FIG. 4A' also illustrates the presence of edges E1, E4, and E5. Note however, that FIG. 4A' also associates this planar area with a counterclockwise arrow denoting, in accordance with the righthand rule, a normal direction pointing in a generally upward direction. This normal direction is of course, perpendicular to the planar area shown in FIG. 4A. As pointed out above, it is the convention in the figures shown that the normal direction is selected to be in a direction away from the "on" vertex, here namely vertex V1. The orientation of the surface is preferably provided by an appropriate ordering of the vertices of the generated polygon. In this case, the sequence 1,4,5 also conveys information with respect to surface orientation. Alternate means for describing this surface also include the number triplet 4,5,1 and the number triplet 5,1,4. However, solely for the purpose of ease of comparison and understanding, the general rule employed herein is to designate each such number triplet so as the numerically smallest number is listed first. Accordingly, the planar area illustrated in FIG. 4A is described by the number triplet 1,4,5. Accordingly, this number triplet is entered in Table I below for the case 1 situation.

TABLE I

| CASE | VERTICES<br>8 7 6 5 4 3 2 1 | TRIANGLES FOR CONNECTING EDGES | | | |
|---|---|---|---|---|---|
| 0 | 0 0 0 0 0 0 0 0 | 0 0 0 | 0 0 0 | 0 0 0 | 0 0 0 |
| 1 | 0 0 0 0 0 0 0 1 | 1 4 5 | 0 0 0 | 0 0 0 | 0 0 0 |
| 2 | 0 0 0 0 0 0 1 1 | 4 5 6 | 2 4 6 | 0 0 0 | 0 0 0 |
| 3 | 0 0 0 0 0 1 0 1 | 1 4 5 | 2 7 3 | 0 0 0 | 0 0 0 |
| 4 | 0 1 0 0 0 0 0 1 | 1 4 5 | 7 10 11 | 0 0 0 | 0 0 0 |
| 5 | 0 0 0 0 1 0 1 1 | 5 6 8 | 3 8 6 | 2 3 6 | 0 0 0 |
| 6 | 1 0 0 0 0 0 1 1 | 8 11 12 | 4 5 6 | 2 4 6 | 0 0 0 |
| 7 | 1 0 1 0 0 0 0 1 | 1 4 5 | 8 11 12 | 6 9 10 | 0 0 0 |
| 8 | 0 0 0 0 1 1 1 1 | 5 6 8 | 6 7 8 | 0 0 0 | 0 0 0 |
| 9 | 0 0 0 1 1 0 1 1 | 2 9 6 | 2 3 9 | 3 12 9 | 3 8 12 |
| 10 | 0 1 0 1 0 1 0 1 | 1 4 9 | 4 12 9 | 2 11 3 | 2 10 11 |
| 11 | 1 0 0 0 1 0 1 1 | 5 11 12 | 3 11 5 | 2 3 5 | 0 0 0 |
| 12 | 0 1 0 0 1 0 1 1 | 5 6 8 | 3 8 6 | 2 3 6 | 7 10 11 |
| 13 | 1 0 1 0 0 1 0 1 | 1 4 5 | 6 9 10 | 2 7 3 | 8 11 12 |
| 14 | 1 0 0 0 1 1 1 0 | 7 11 12 | 7 12 4 | 1 7 4 | 0 0 0 |

The various cases considered are also described in FIGS. 3 and 4. For convenience, Table II below is provided to facilitate reference to the appropriate figures for the 15 cases presented herein.

TABLE II

| CASE | FIGURES |
|---|---|
| 0 | None |
| 1 | 3A, 4A, 4A' |
| 2 | 3B, 4B, 4B', 4B" |
| 3 | 3C, 4C, 4C' |
| 4 | 3D, 4D, 4D' |
| 5 | 3E, 4E, 4E' |
| 6 | 3F, 4F, 4F' |
| 7 | 3G, 4G, 4G' |
| 8 | 3H, 4H, 4H' |
| 9 | 3I, 4I, 4I' |
| 10 | 3J, 4J, 4J' |
| 11 | 3K, 4K, 4K' |
| 12 | 3L, 4L, 4L' |
| 13 | 3M, 4M, 4M' |
| 14 | 3N, 4N, 4N' |

Table I above is important for an understanding of the operation of the present invention. This table is illustrative of the means employed herein for strategically representing approximating surfaces using formats which are easily recognized by graphic display processors. Accordingly, the following conventions have been employed in the construction of Table I. In particular, for each eight bit vector address in the column labelled "VERTICES", there is a corresponding sequence of up to four number triplets representing appropriate triangular approximating surfaces. Each approximating surface is specified by a triplet of edge numbers. In each triplet, the lowest numerical edge number is employed first. Additionally, each set of triplets occurs in an order which is reflective of the surface normal direction chosen. It should, of course, be appreciated that by convention one could have selected surface normals to be oriented in the opposite direction. This is, however, merely a matter of design choice, the only important aspect being that a consistent choice be made.

It should also be pointed out that the results generated in Table I are dependent upon the specific labelling arrangement for the vertices and the edges of the cubical or rectangular voxel element. However, once a labelling scheme is decided upon, it is important that the same labelling arrangement be employed in considering each of the cases listed. It is also useful to point out that in case 0, no triangular or other surface representational signals are generated since this corresponds to the situation in which the surface selected does not intersect the chosen voxel element. Table I indicates this situation as a string of zeros in the row of Table I corresponding to case numeral 0. It is also noted that for each case, up to four triangular surface regions are generated from the table. However, it is noted that it is also possible to employ a table in which polygonal rather than triangular surface approximations are generated. More is said about this particular point below.

Figure 4B:
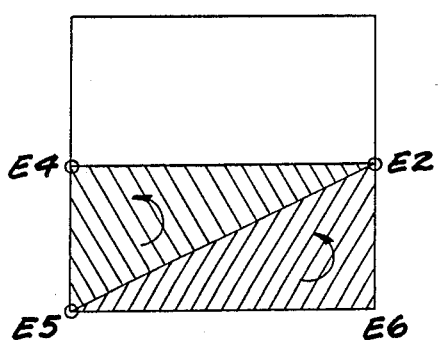
FIG. 4B" illustrates a plan view of FIG. 4B illustrating a slightly different polygonal representation as compared with that shown in FIG. 4B'.
Figure 3B:
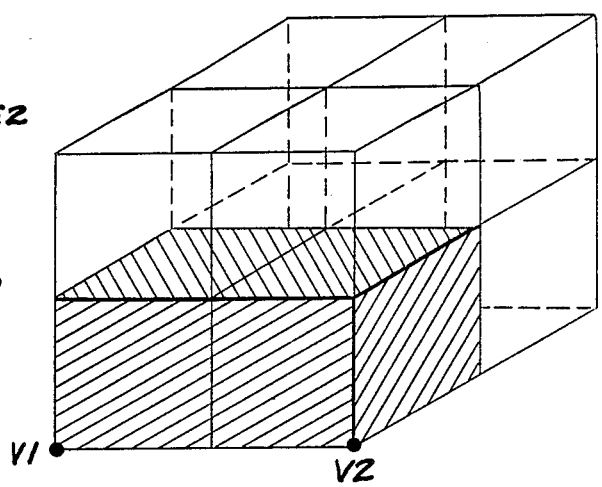
Figure 4B:
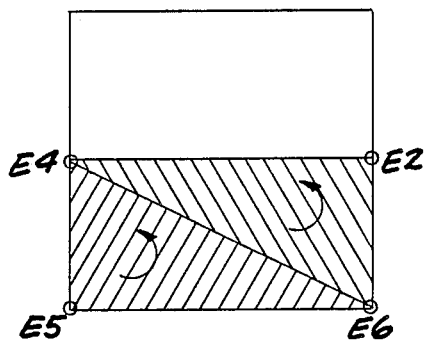
Figure 4B:
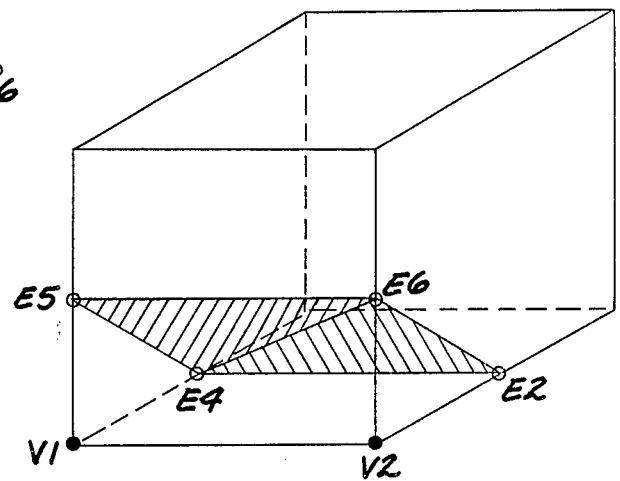

Consideration is next turned to case 2 as particularly illustrated in FIGS. 3B, 4B, 4B' and 4B". A generic form of case 2 is shown in FIG. 3B representing the case in which two adjacent vertices and only two such vertices are found to either exceed or fall below the selected threshhold value. In this case, "adjacent" means vertices having a single edge in common. For this reason, it is seen that case 2, as shown, actually includes 12 subcases corresponding to the selection of adjacent vertex pairs, or equivalently 12 edges. Additionally, it is seen that, by considering complementary cases, the number of actual subcases covered by case 2 is 24. It is thus seen that this is the manner in which the 256 possible cases are reduced to a manageable number in accordance with the present invention. For example, it is seen that case 2 covers those situations in which the following pairs of vertices are selected: V6 and V7, V4 and V1, V3 and V7, V2 and V3, etc. When one considers complementary cases, it is seen that FIGS. 3B and 4B also include the case in which the data values associated with vertices V3, V4, V5, V6, V7, and V8 all either exceed or fall below a specified threshhold value. These subcase listings are, however, only exemplary of the full range of possibilities. Rotations of the three dimensional cube about any of its symmetry preserving axes clearly shows that all of these subcases are equivalent except for orientation. The basic structure of each case is nonetheless distinct across the set of cases, but uniform within each of the subcase situations.

FIG. 4B indicates the polygonal approximating surface generated in case 2. In particular, the polygon with vertices on edges 2, 4, 5, and 6 (in that order) is the result. However, it is also seen that any polygonal approximating surface which is generated may also be generated by a corresponding set of triangular surfaces. These triangular surfaces are also illustrated in FIG. 4B. It is thus seen that case 2, using Table I, results in the generation of triangles 4, 5, 6, and 2, 4, 6. The quadrilateral in this instances, is broken up into two triangles having the line joining edges E4 and E6 as a common edge. The top view of this configuration is shown in FIG. 4B'. However, it is also noted that it is possible to break up the quadrilateral into two triangles in the manner indicated in FIG. 4B" by including as a diagonal, the line joining edges E2 and E5. In those cases in which polygons having more than three sides are generated, it is seen that this kind of potential ambiguity results. However, image quality is not degraded in any significant fashion by this ambiguity as long as consistent choices are made. In the present invention, consistency is easily assured by using a fixed version of Table I throughout the generation of an image. However, it is noted that these kinds of variations in Table I are also included in the concept of the present invention. Thus, it would also be possible in accordance with FIG. 4B' to generate in case 2 of Table I, triangles 2, 4, 5, and 2, 5, 6, rather than triangles 4, 5, 6, and 2, 4, 6 without departing from the spirit and scope of the present invention. The present invention also includes the concept of generating quadrilaterals or other polygons in association with the various cases as appropriate. Thus, in case 2, it is also possible to employ a table which is used to generate a quadrilateral described as an edge sequence. In case 2, this edge sequence would be 2, 4, 5, 6, or any cyclic permutation thereof, it being understood, of course, that cycles taken in the opposite direction produce reversed normal directions. In this last regard, it is noted that all that is required in the practice of the present invention is consistency in the selection of the normal direction, either choice either being adequate in itself or readily compensated for.

It is also appropriate to note that, with respect to Table I, the order in which the number triples are listed is not important. For example, for case 2, it would have been just as appropriate to list edge triple 2,4,6 before edge triple 4,5,6.

Figure 3C:
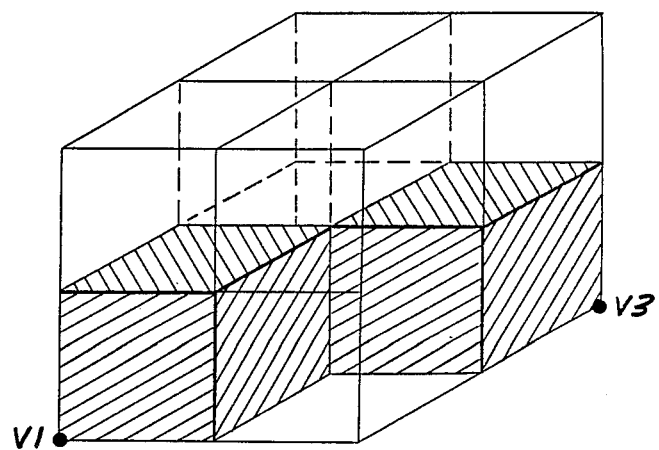
Figure 4C:
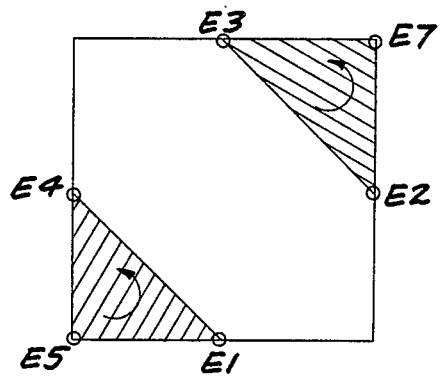
Figure 4C:
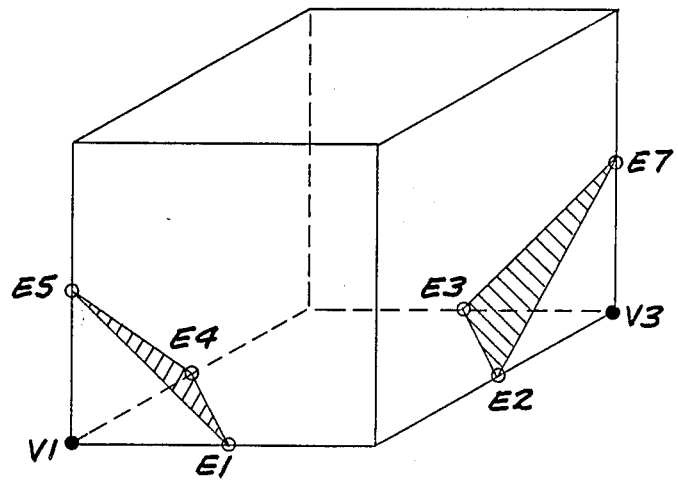

Case 3, as illustrated in FIGS. 3C, 4C, and 4C', illustrate the case in which a pair of facially diagonally disposed vertices are selected. This would include subcases such as: V1 and V6, V4 and V7, V2, and V4, V5 and V7, etc. As above, the complementary subcases are also covered by the same set of approximating surfaces but with their normal directions reversed. Case 3 is treated in much the same manner as the other cases. The significant new feature indicated in case 3 is the fact that the surface approximations generated in the present invention do not necessarily comprise contiguous surface elements. The resultant triangles generated in case 3 are listed in Table I and effectively covers all those vertex pairs selections which lie on the same facial diagonal. Since there are 6 faces and two diagonals per face, case 3 actually includes 12 uncomplemented subcases and 12 complementary subcases. Again, the reduction of the cases to a more manageable number is readily apparent.

Figure 3D:
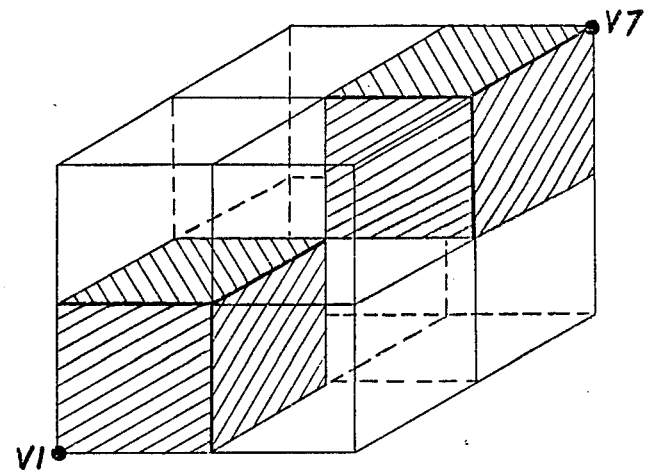
Figure 4D:
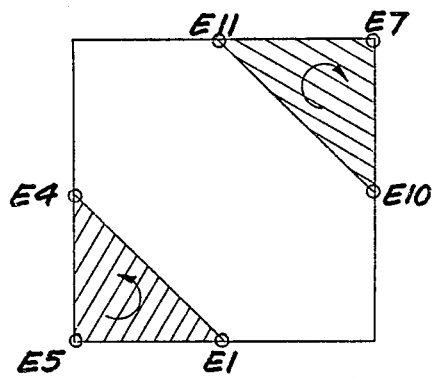
Figure 4D:
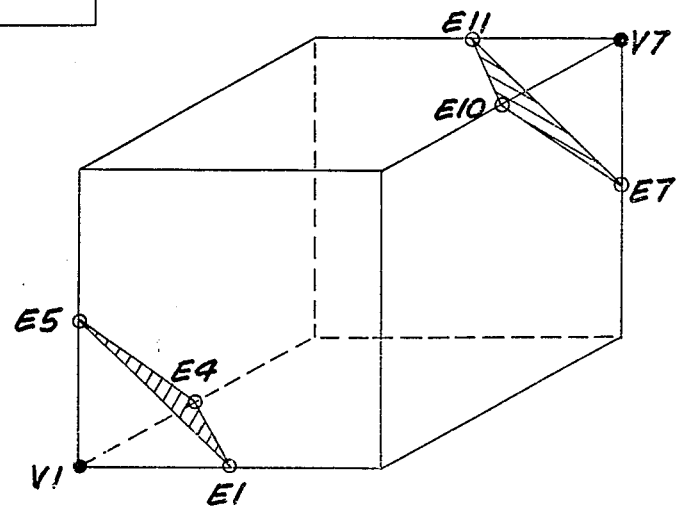
Figure 3E:
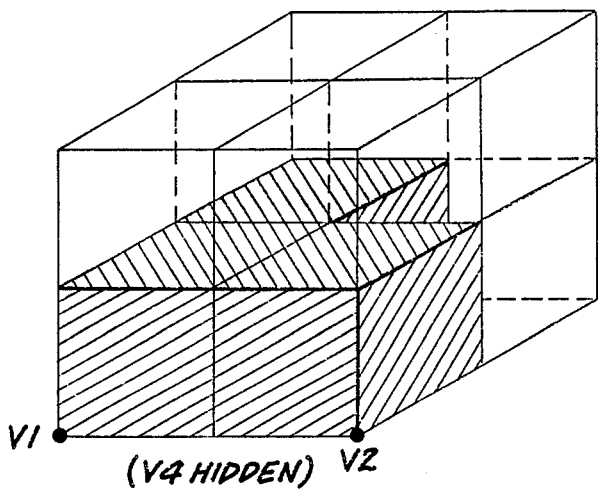
Figure 4E:
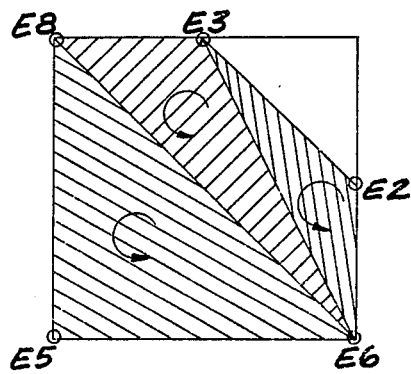
Figure 4E:
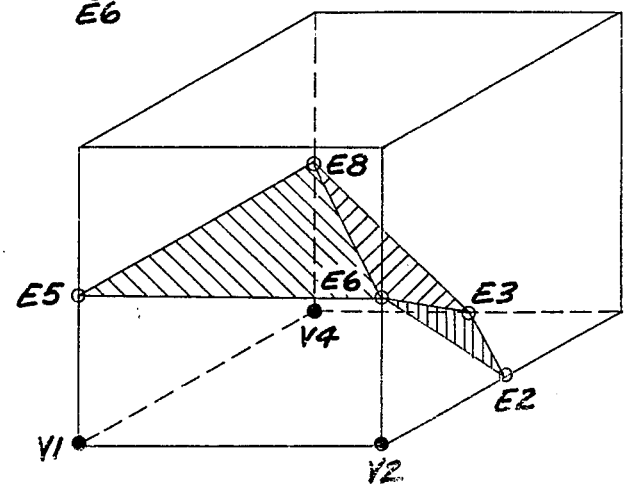
Figure 3F:
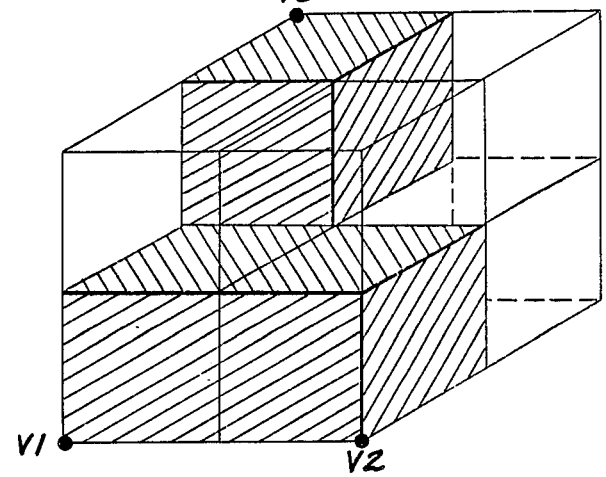
Figure 4F:
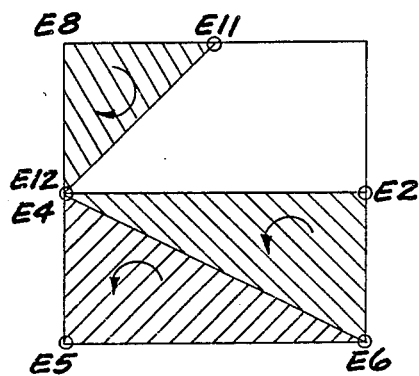
Figure 4F:
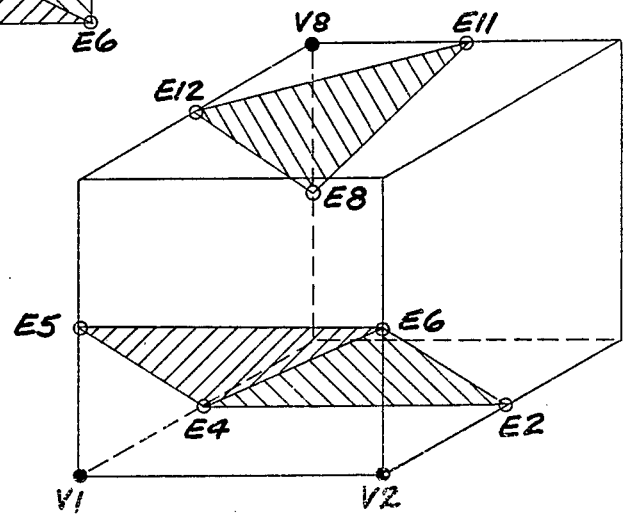
Figure 3G:
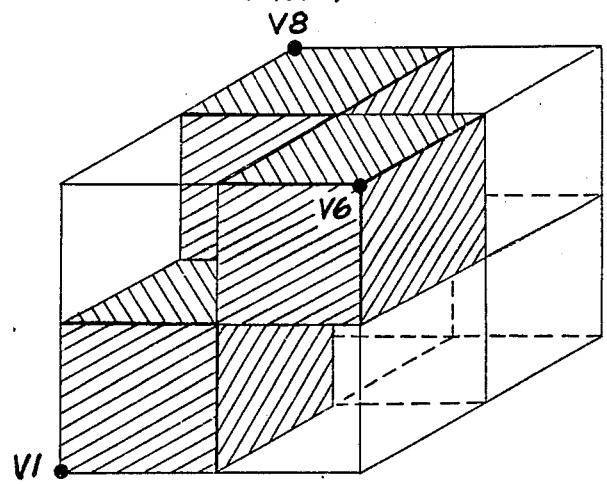
Figure 4G:
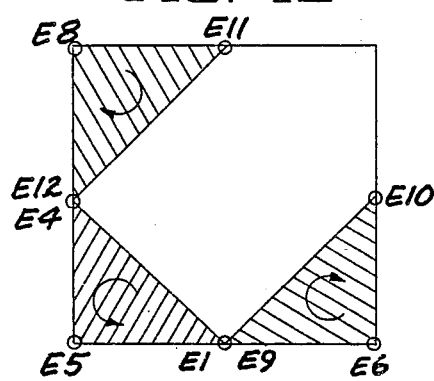
Figure 4G:
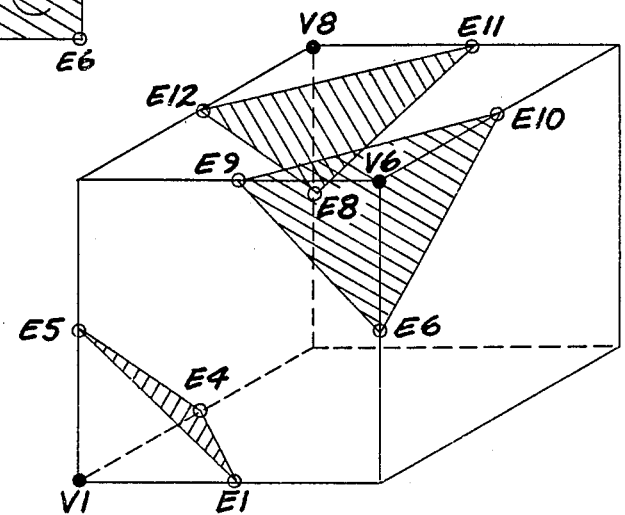
Figure 3H:
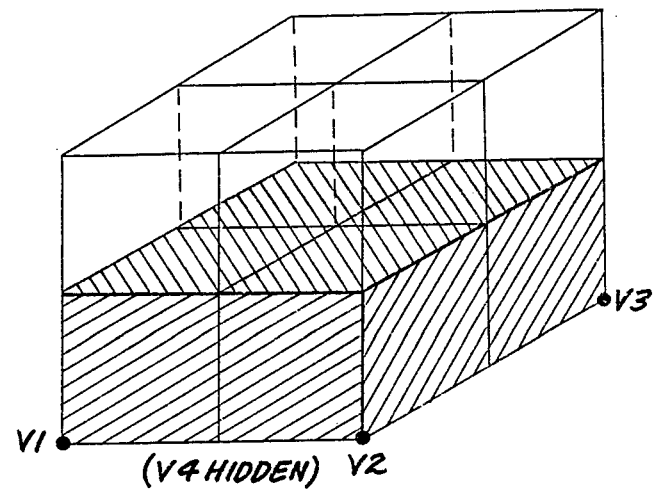
Figure 4H:
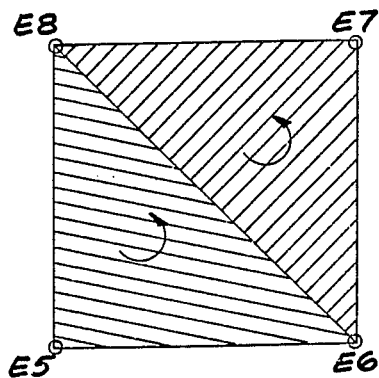
Figure 4H:
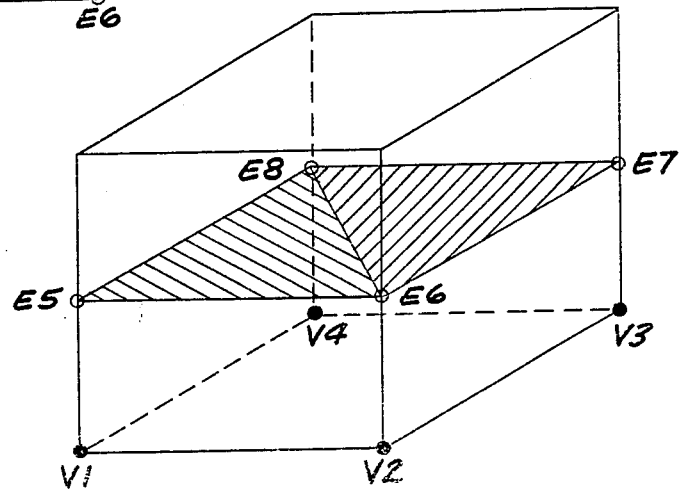
Figure 3I:
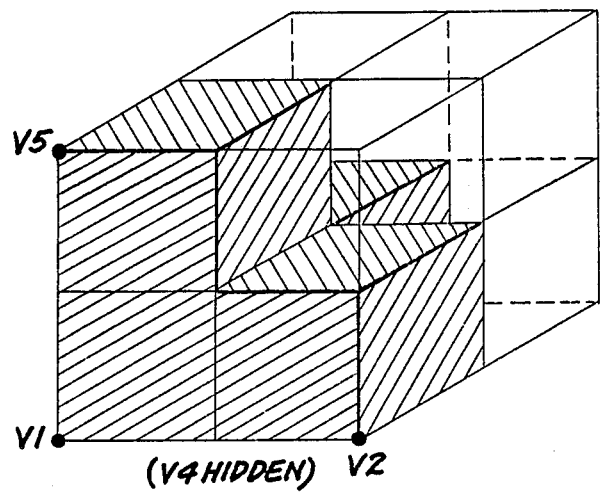
Figure 4I:
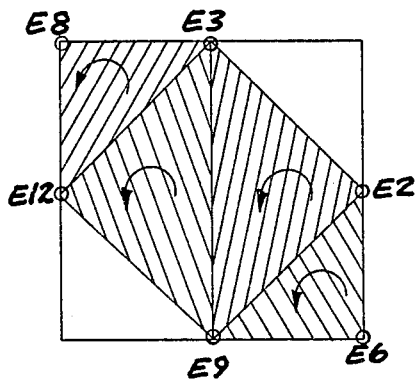
Figure 4I:
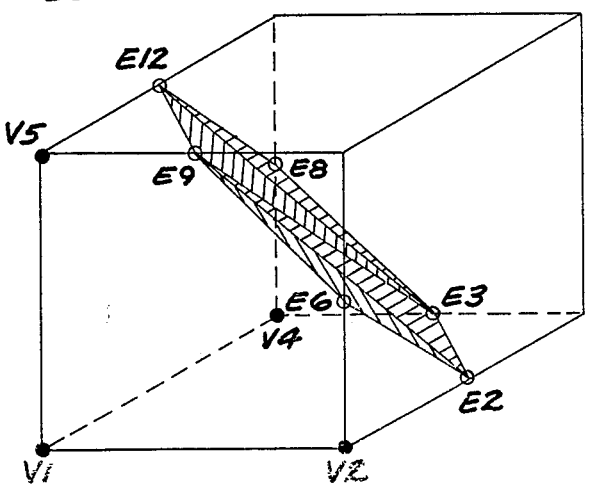
Figure 3J:
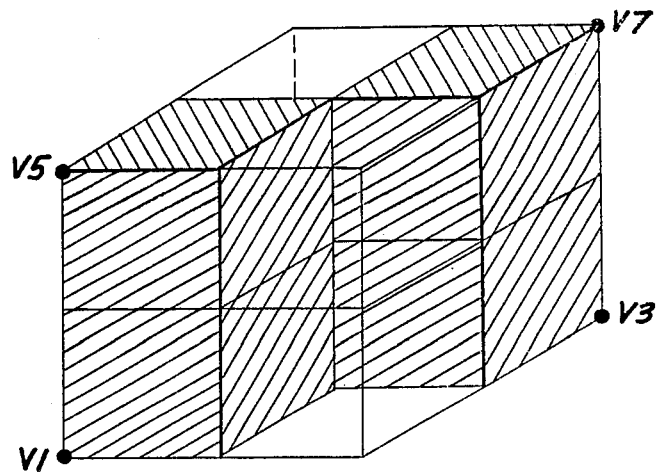
Figure 4J:
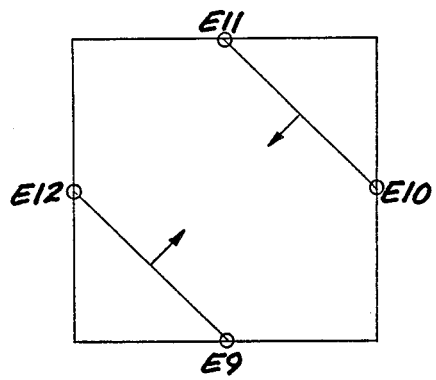
Figure 4J:
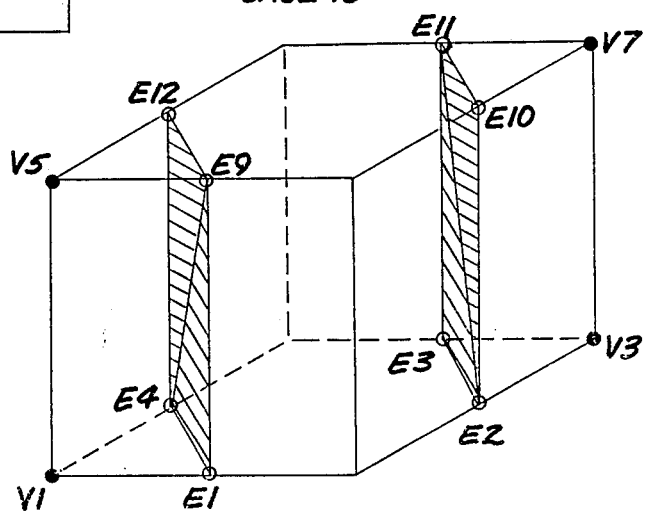
Figure 3K:
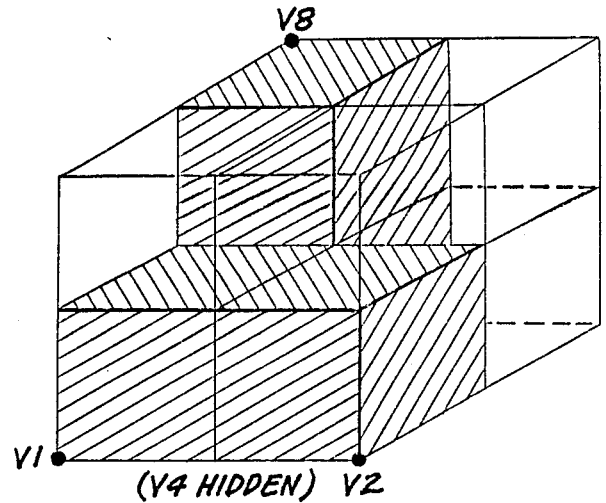
Figure 4K:
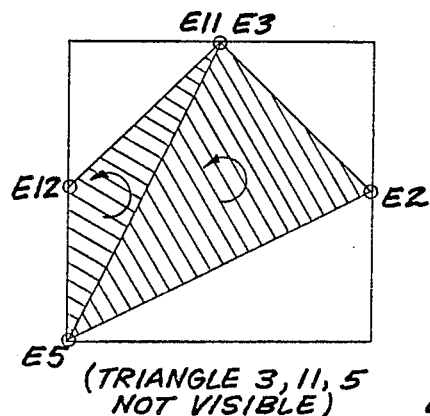
Figure 4K:
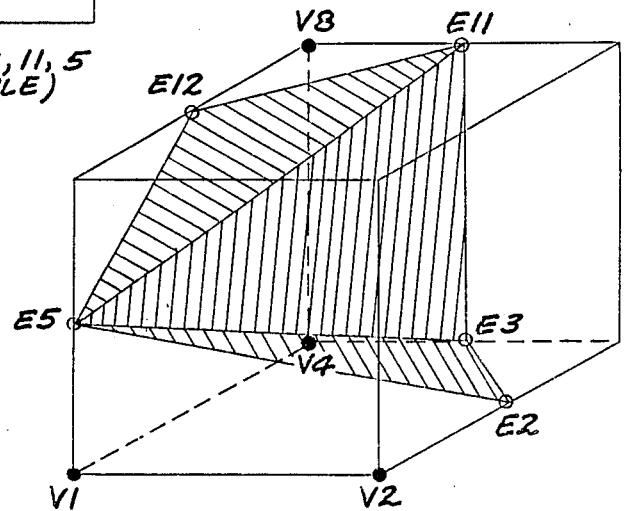
Figure 3L:
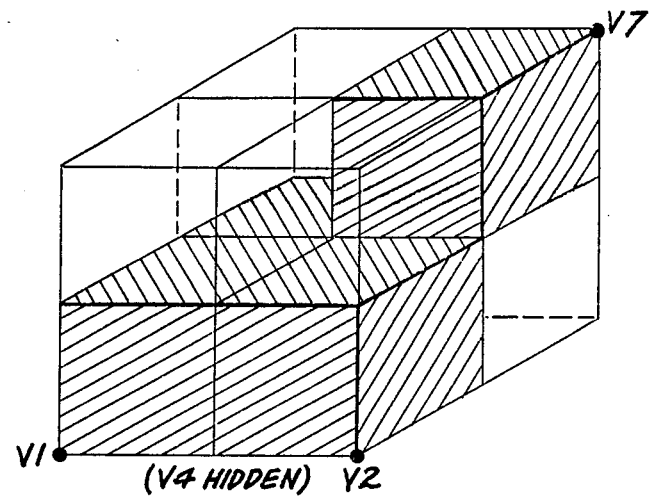
Figure 4L:
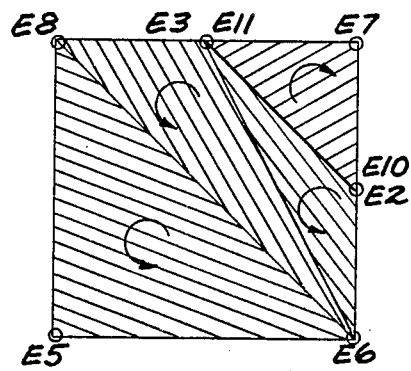
Figure 4L:
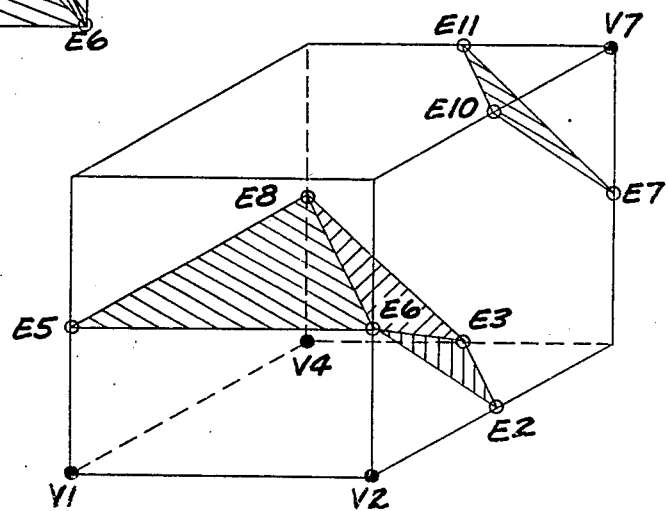
Figure 3M:
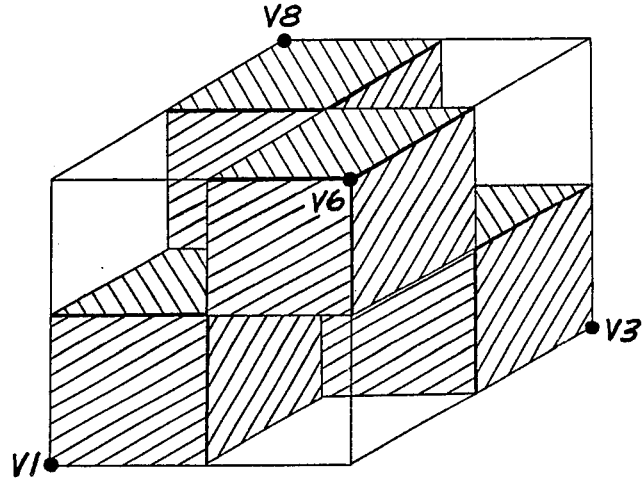
Figure 4M:
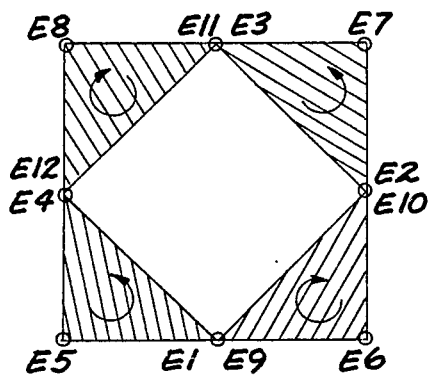
Figure 4M:
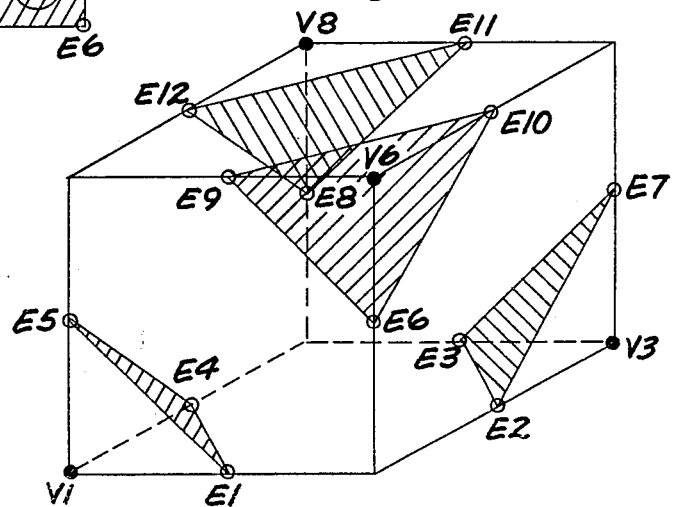
Figure 3N:
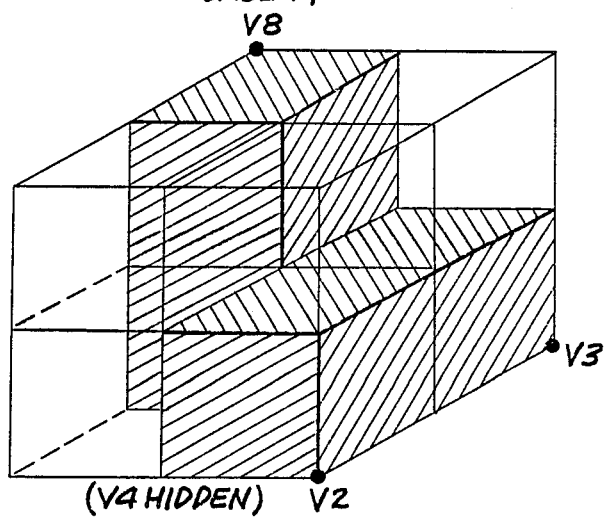

Next is considered the situation occurring in case 4, which is particularly illustrated in FIGS. 3D, 4D, and 4D'. Case 4 actually represents that set of subcases in which the pair of vertices selected lies on a body diagonal of the cube. Since there are four such body diagonals, case 4 corresponds to four uncomplemented subcases and four complemented subcases for a total of eight subcases. The surfaces generated in accordance with the present invention are particularly illustrated in FIG. 4D. A top view of the cube shown in FIG. 4D is shown in FIG. 4D'. It is perhaps advantageous in this situation to note the directions of the circulating arrows shown. These "circulating arrows" orient the surface by specifying, the normal direction in accordance with the righthand rule. There is, of course, nothing special about specifying a righthand rule, the only important aspect being that consistency is maintained.

Figure 4N:
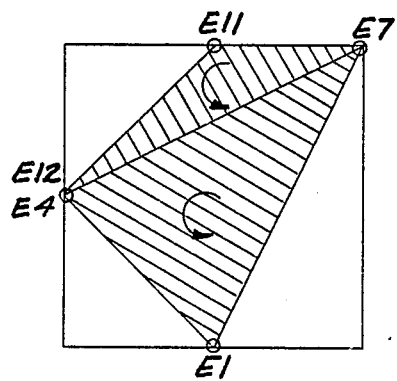
Figure 4N:
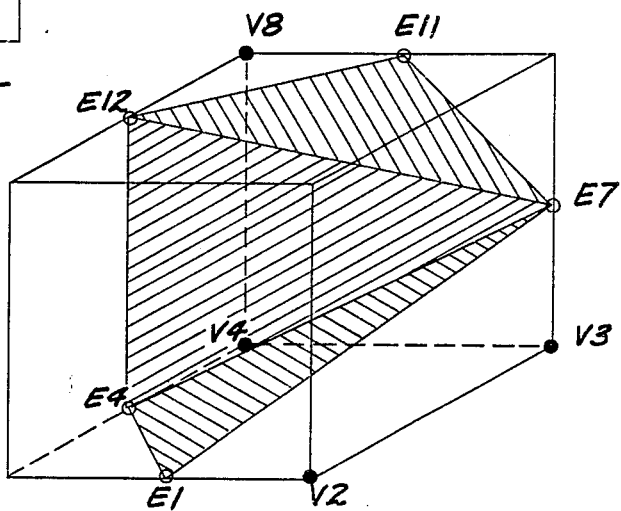

It is also appropriate to note that the vertices of the triangles shown in FIGS. 4A–4N are shown as lying at the midpoints of the edges of the cube. However, it is also important to note that a preferred embodiment of the present invention incorporates an interpolation mechanism which adjusts the position of the edge points in accordance with the data values obtained at the vertices of the voxel element. This provides significantly improved shading for the images generated, restoring much of the information potentially lost in establishing a dichotomizing surface between vertex points.

Next is considered case 5. Case 5 is handled in the same manner as the cases described above. However, the principal additional aspect now being the fact that three vertices are selected for separation. Case 5 covers all of those subcases in which the three vertices selected lie on the same face of the voxel element. It is thus seen that there are then six uncomplemented and six complemented subcases of this sort. Thus, case 5 actually incorporates 12 subcases. The practical effect of this incorporation is that a detailed analysis of each of the subcases is avoided, these being covered instead by equivalences induced by rotation and complementation operations. It is also seen that case 5 is different from the other cases considered so far in that there are actually three triangles generated. These triangles are listed in case 5 in Table I as triangles (edge lists) 5,6,8; 3,8,6; and 2,3,6. The top view shown in FIG. 4E' provides a view which illustrates the use of circulating arrows to indicate surface orientation. The surface generated in case 5 not only includes three triangles, but it is seen that only two of these triangles lie in the same plane. However, it is noted that the planarity of the approximating surface which is generated is highly dependent upon modifications made as a result of an interpolation step. It is also noted that a table of polygons, as opposed to triangles, could also be established so as to associate case 5 situations with an edge list such as 2,3,8,5,6, or appropriate variations thereof as determined by particular subcases. However, the use of triangles is preferred since a finer resolution is generally obtained with more precise specification of normal directions.

Cases 6–14 are illustrated in FIGS. 3F–3N, FIGS. 4F–4N, and FIGS. 4F'–4N'. Case 14 in particular arises out of the fact that case 11 does not possess chiral symmetry, that is, no rotation of the cubes in case 11 (FIG. 3K) can orient the inner cubes in the manner illustrated in FIG. 3N. These two cases do, however, possess mirror image symmetry. This symmetry is reflected in FIGS. 4K and 4N. Cases 6–14 are constructed in the same manner as described above. These constructions are illustrated in the appropriate figures, as described in Table II. Accordingly, a detailed analysis of each of these cases is not necessary at this point since they are self-explanatory in light of the material above. However, it is useful to consider these figures for the purpose of determining that the cases considered therein together with appropriate symmetries induced by rotation and complementation serve to cover all of the remaining possibilities. It should also be noted that Table I, in the column labelled "VERTICES" provides in effect, an eight bit vector which is uniquely associatable with one or more edge sequences denoting triangles or polygons which approximate surface intersections with the cubical or rectangular voxel element. The analysis illustrated in Table I is repeated for each of the voxel elements and is used to provide a vector list for receipt by display processor means which is capable of converting the data list to either a vector scan format or to a raster scan format.

FIG. 5 is important for an understanding of the interpolation which is preferably employed in the present invention. FIG. 5 illustrates a voxel element with data values provided at each of the eight vertices. It is important to note that the numbers shown at the vertices in FIG. 5 are data values, not vertex labels. In particular, FIG. 5 illustrates case 2 with a threshhold value of 6. It is seen that the only two vertices which exceed this value are the two lower front vertices, each having an assigned data value of 10. If this cube had been labelled with the vertices of FIG. 1, the corresponding labels would be V1 and V2 (assuming that the cube in FIG. 1 and FIG. 5 are oriented in the same direction). It is noted that each of the open circles in FIG. 5 have been displaced a certain distance from the midpoints of the edges. Thus, while the separating surface shown for case 2 in FIG. 4B is planar, it is seen that the interpolation provided in the present invention does not restrict the approximating surfaces in this manner. This results in much sharper images with improved three dimensional shading clues. It is seen that each of the vertex points for the triangles are moved along a voxel edge by a distance which is a function of the data values at the vertex points which determine the edge. For example, it is seen that the distance "a" along what corresponds to edge E2 may be chosen to be proportional to $3/(10+3)$ since 10 and 3 are the data values associated with this edge. In a like manner, the distances b, c, and d are chosen based upon the values at the vertex points which determine each edge. If desired, interpolation may also involve use of the selected threshold value. It is noted that the vertex points for the approximating surfaces generated in the present invention are therefore determined in such a way that consistent approximating surfaces are defined for adjacent voxel elements. Each voxel element is, of course, a cubical (but more generally a parallelopiped) volume such as is shown in FIG. 5 and the figures previously discussed.

Figure 6A:
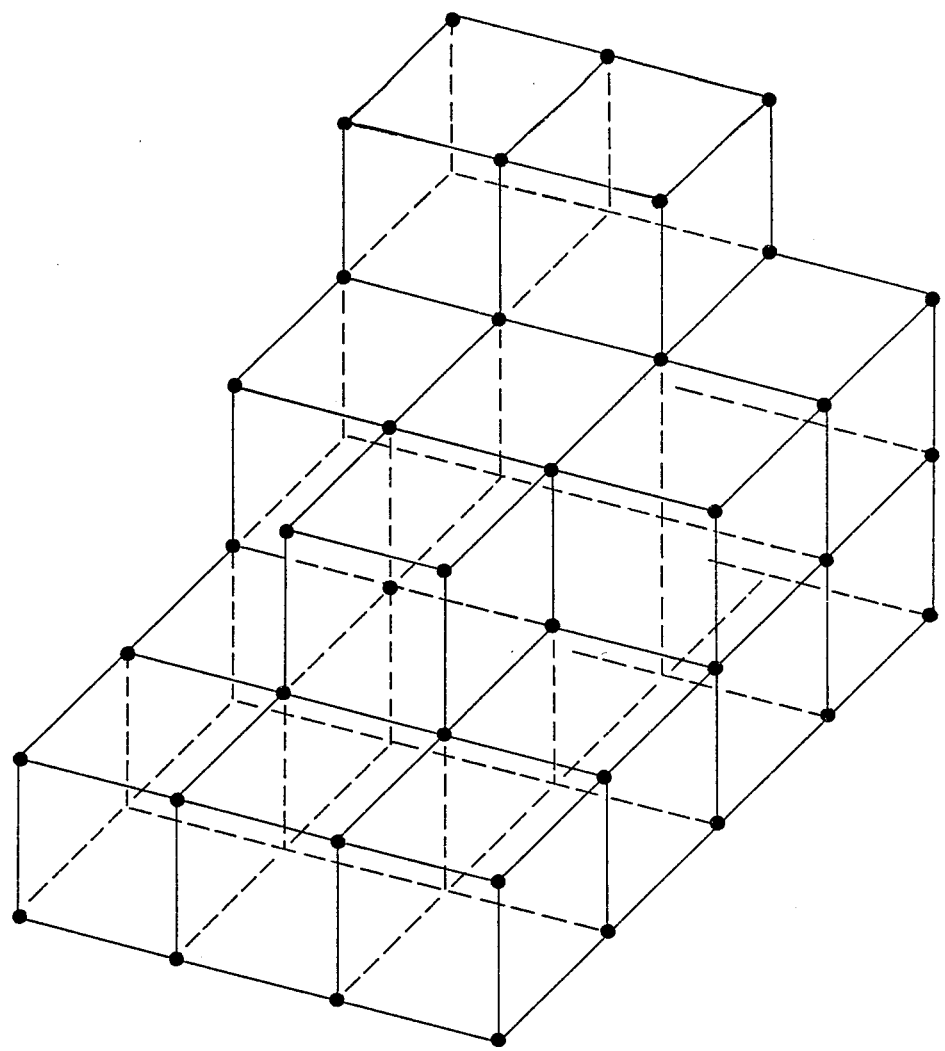
FIG. 6A is an isometric view illustrating a network of quantized binary data points lying on the vertices of a cubical grid structure.
Figure 6B:
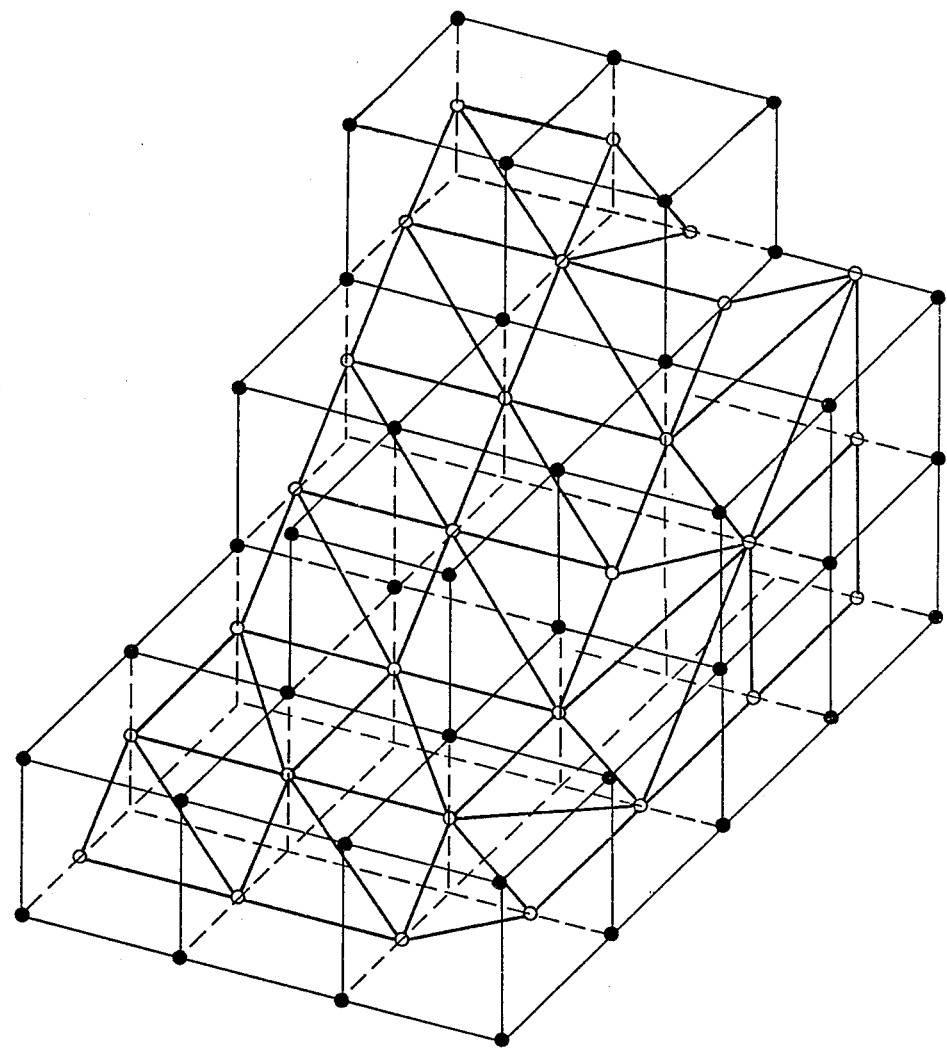
FIG. 6B is an isometric view similar to that shown in FIG. 6A in which the present invention is illustrated for a set of contiguous voxel elements.
Figure 6C:
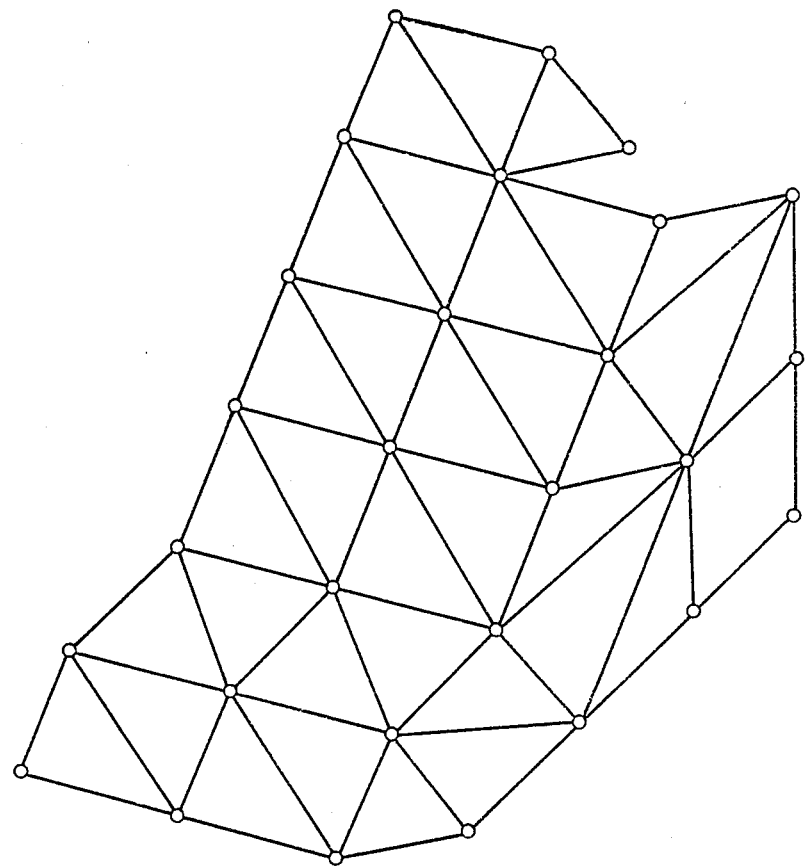
FIG. 6C is an isometric view of the three dimensional surface structure produced in accordance with the present invention in FIG. 6B but drawn separately from the data points so as to provide a better view of the approximating surface for the data elements shown in FIG. 6A.

It is, of course, important to be able to piece together surface structure representations from the approximating surfaces (polygons or triangles) generated for each voxel element. An example of this restructuring is provided in FIGS. 6A, 6B, and 6C. FIG. 6A illustrates a small section of contiguous three dimensional voxel elements. Each filled-in circle located at a vertex point of a cube in FIG. 6A corresponds to a comparison of the data value associated with that vertex and a threshhold level. It is the threshhold level or range which operates to select the desired surface within the three dimensional array. Accordingly, it is an object of the present invention to rapidly determine and describe a surface which separates the vertices with filled circles in FIG. 6A from the rest of the vertices. These remaining vertices lie along the intersections of lines which are shown dotted in FIG. 6A. If one carries out the method of the present invention for the vertex set shown in FIG. 6A, the resulting surface structure is shown in FIG. 6B. For purposes of clarity, the underlying surface structure is shown separately in FIG. 6C. In FIGS. 6B and 6C, the vertex points of the approximating surfaces chosen are shown as open circles. It should be noted that, for clarity, FIGS. 6B and 6C do not include any interpolative modifications of the vertex points. The structure of the output presented in FIG. 6C is best described as being in vector form, that is, a sequence of connected vertex points. In one embodiment of the present invention, the data embodying FIG. 6C comprises a list of such vectors in three dimensions. The list may also include a normal vector associated with each triangular or polygonal region. It is noted that different display processors require data in somewhat different forms. However, the method and apparatus of the present invention are capable of generating data signals in any appropriate format. It is further noted that, in a preferred embodiment of the present invention, a shaded, rasterized image is produced in which each triangular or polygonal surface approximation is shaded on a gray scale basis in dependence upon the relation between the viewing angle selected with respect to the direction of the normal vector to the approximating surface element. To produce smoothly shaded images, the unit normal of each triangle sharing a common vertex is averaged together at the vertex to produce a shared normal. The graphics processor may used shared normals to grade the calculated intensity over the polygonal facet to create a smoothly shaded image. These surface elements are generated for each voxel element which experiences an intersection with the desired surface. Examples of the resulting images are more particularly described in FIGS. 10, 11, and 12, discussed more fully below.

Figure 7:
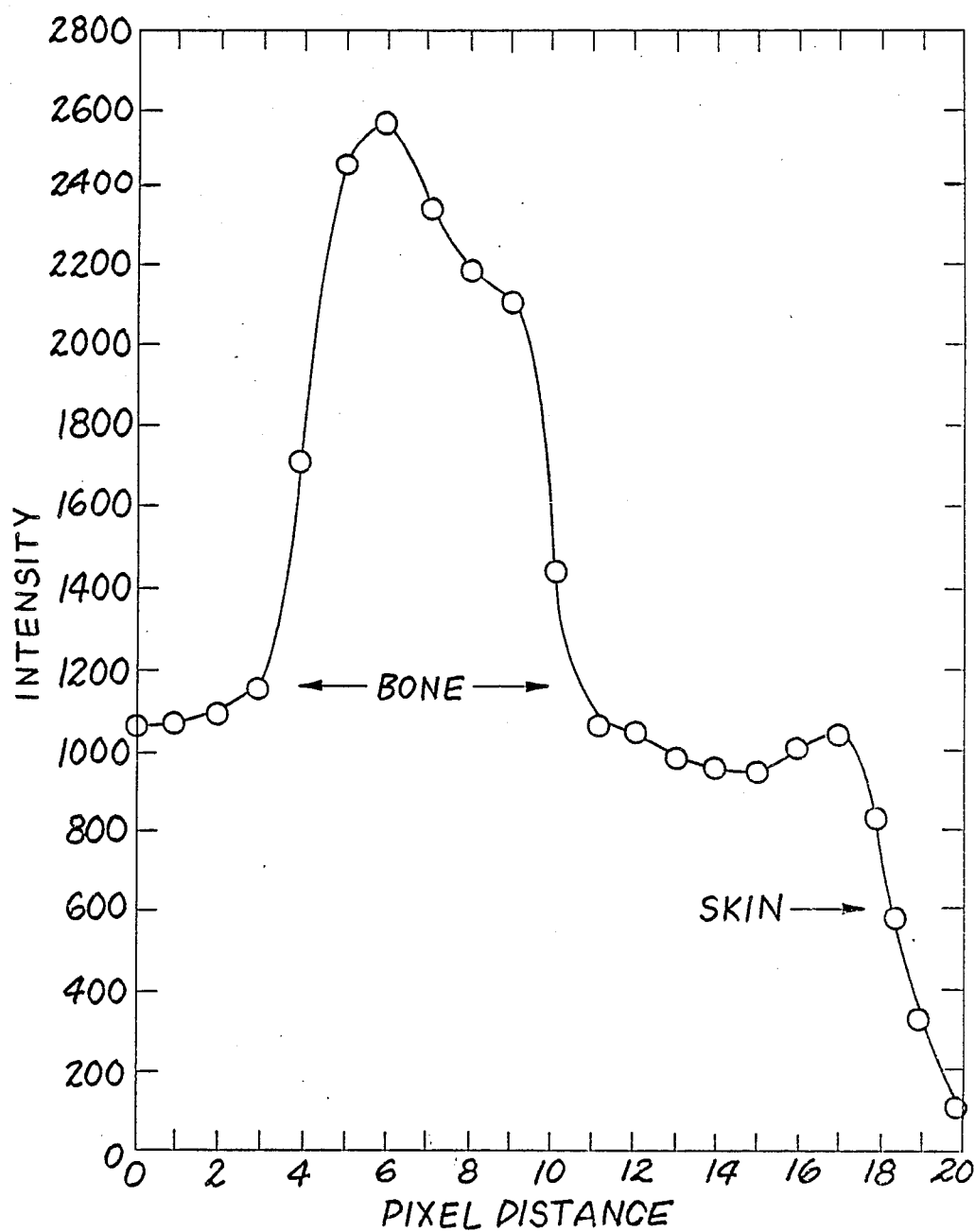
FIG. 7 is a plot of intensity as a function of pixel distance which particularly points out the ability to distinguish internal body structures as a function of the measurement of various physical properties.

As pointed out above, it is the threshhold value or range which determines the surface or surfaces to be reconstructed on a display device in accordance with the present invention. From the point of view of medical imaging applications, one of the significant advantages of the present invention is that one can selectively view a plurality of different tissue types. The type selection is made on the basis of observed physical properties. For example, in computed x-ray tomography systems, the physical property of import is the x-ray absorption capabilities of various bodily tissues. For example, x-ray absorption in bone is much higher than absorption in skin and other tissues. This fact is particularly illustrated in FIG. 7 which is a sample plot of x-ray absorption intensity as a function of pixel distance. In particular, regions for bone and skin are indicated in the figure. It is these physical differences, sampled in a three dimensional space which facilitates the construction of three dimensional surface images in the present invention. While FIG. 7 is particularly directed to the situation occurring in x-ray tomography, it is pointed out that the present invention is not so limited and is usable in any situation in which physical properties of the body being studied are sampled at regularly spaced portions throughout the three dimensional extent of the body. Such data is also generated in nuclear magnetic resonance imaging systems, ultrasound systems, scintillation systems, and systems employing such methods as positron emission tomography. For example, in magnetic resonance imaging, measurable physical properties can include spin-spin and spin-lattice relaxation times. It is noted, however, that the list of these systems is exemplary and that the present invention is not limited thereto. Additionally, many of these systems generate data in an integer representation. However, the present invention is capable of employing data in any format containing totally ordered (in the mathematical sense) data elements.

Figure 8:
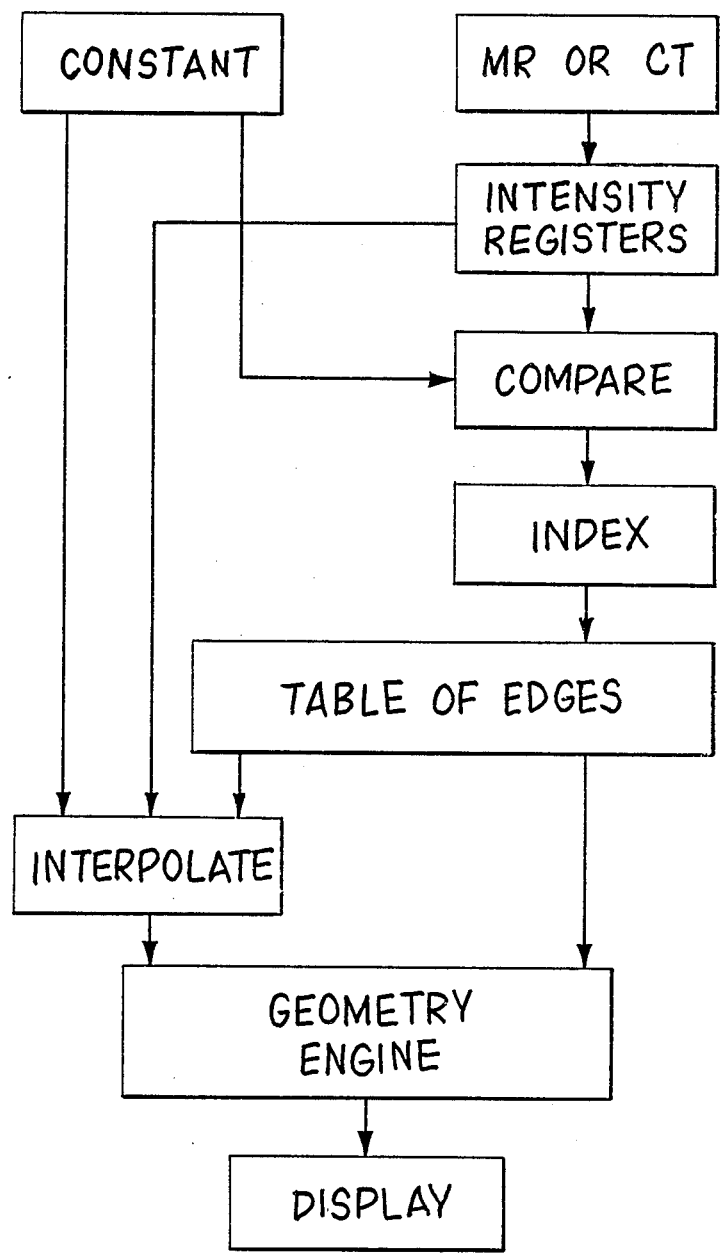
FIG. 8 is a flow chart illustrating data flow in the present invention.

A data flow diagram of the present invention is shown in FIG. 8. In particular, data from magnetic resonance or computed tomography systems is illustrated as being supplied to a set of intensity registers. Typically, the data is structured in the form of a plurality of layers. In the present invention, only two adjacent layers are required at one time for data processing. Even more particularly, a single voxel element at a time is analyzed, each voxel element comprising a set of eight cubically adjacent data points. The term "cubically adjacent" has been defined above. It is noted though that the structure of the present invention readily permits the use of parallel processing systems.

The values in the intensity registers are compared with a predetermined constant for each voxel element present. In general, the constant or threshhold of comparison is the same for each voxel element. This comparison generates an eight bit vector which acts as an index to a table of edges. An abbreviated edge table is shown in Table I for the 15 major case occurrences of the present invention. The other cases being merely obtained from the 15 cases by rotation or complementation. The data from the edge table is then used in conjunction with the data at the vertex points, as contained in the intensity registers to generate a set of points or vectors which are preferably interpolated in the manner described above. The threshhold constant may also be employed in this interpolation. The interpolated data together with a list of table edges, is then supplied to a geometry engine, or display processor, which operates to generate either vector or raster format images. In preferred embodiments of the present invention, the raster format is generated since this format provides better visual clues for three dimensional images. The resultant image is then typically displayed on a screen such as a cathode ray tube (CRT).

It is noted that since the present invention is capable of displaying multiple tissue types, particularly from data generated from nuclear magnetic resonance imaging systems, it is possible to employ color in the displayed image. For example, it is highly suggestive to view images of bone surfaces in black and white. Other tissue types may be displayed in various shades of pink and gray to more closely match actual anatomical conditions. This feature of the present invention is easily provided by using the threshhold value to control the color on the display device.

Figure 9:
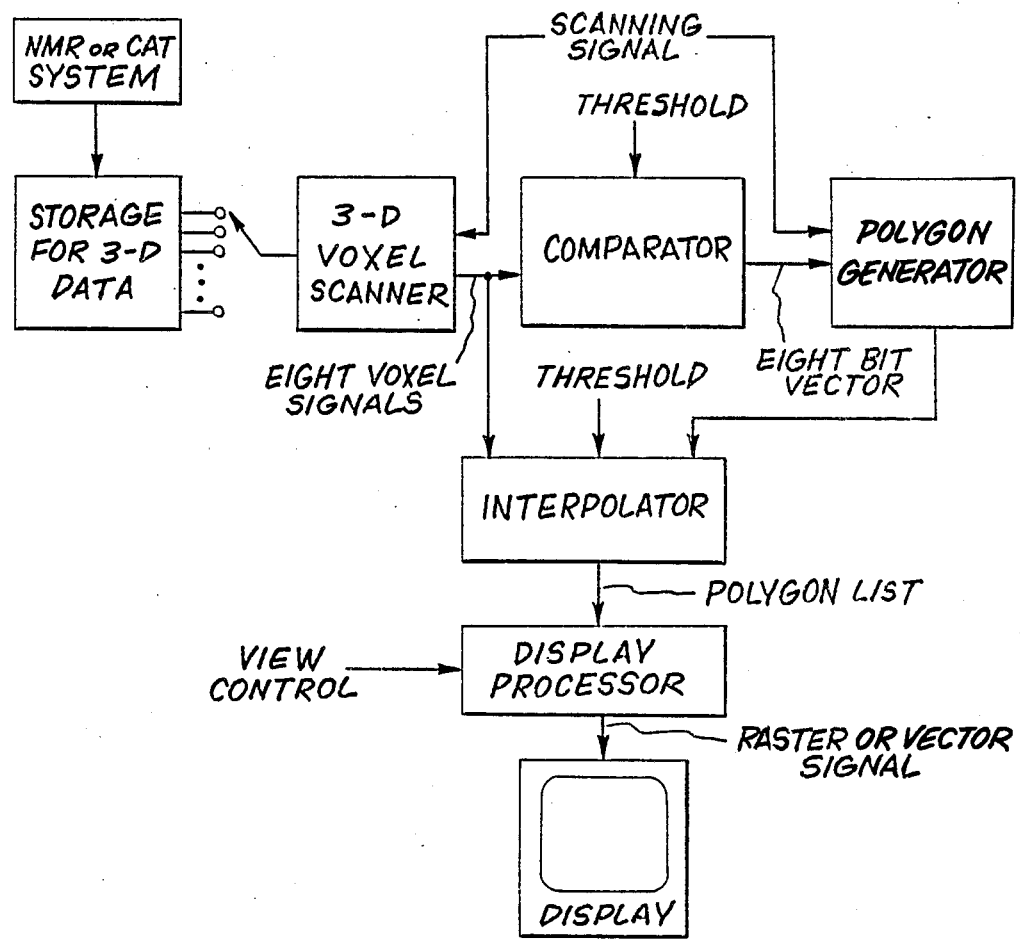
FIG. 9 is a functional block diagram more particularly illustrating functional components in a system constructed in accordance with the present invention.

FIG. 9 illustrates a system for imaging in accordance with the present invention. Three dimensional data is provided by an NMR or computed tomography system. As discussed above, other three dimensional data sources may also be employed. Typically, this information is supplied to a storage system for such three dimensional data. This system typically includes magnetic or other storage media. However, the data may be supplied directly to a sufficiently larger random access device. It is noted, however, that it is only necessary to consider adjacent layers at a single time. In fact, it is only necessary to extract data from eight cubically adjacent data points at one time. A voxel scanner selects the particular set of eight data points for processing. These eight data points are supplied to a comparator which is also supplied with a threshhold value or range of values. The comparator generates an eight bit vector as described above. The eight bit vector is then supplied to a polygon generator. The polygon generator may comprise a read only memory incorporating the full version of Table I with 256 rows constructed as described above. A scanning signal is employed to synchronize the operation of the scanner and the generator. The scanner also supplies the set of eight voxel signals to an interpolator which is supplied with the threshhold value and with the set of vectors from the polygon generator. As described above, an interpolation operation is performed to generate a polygonal surface approximation to the selected surface. The polygonal approximation is particularly adjusted for the proper normal direction by the interpolator. The scanning generation and interpolation operations are performed sequentially for each of the voxel elements in the data to generate a polygon list which is supplied to a display processor. Such display processors are readily available and are well known to those skilled in the computer aided drafting and design and computer aided manufacturing arts (CAD/CAM). In such devices, a viewing direction is typically selected. This view control is selectable by the operator. The display processor then generates a vector or raster format signal which is supplied to a CRT display device.

Figure 10:
FIG. 10 is a photograph of a CRT image of the skull of a living human being shown from the front.
Figure 11:
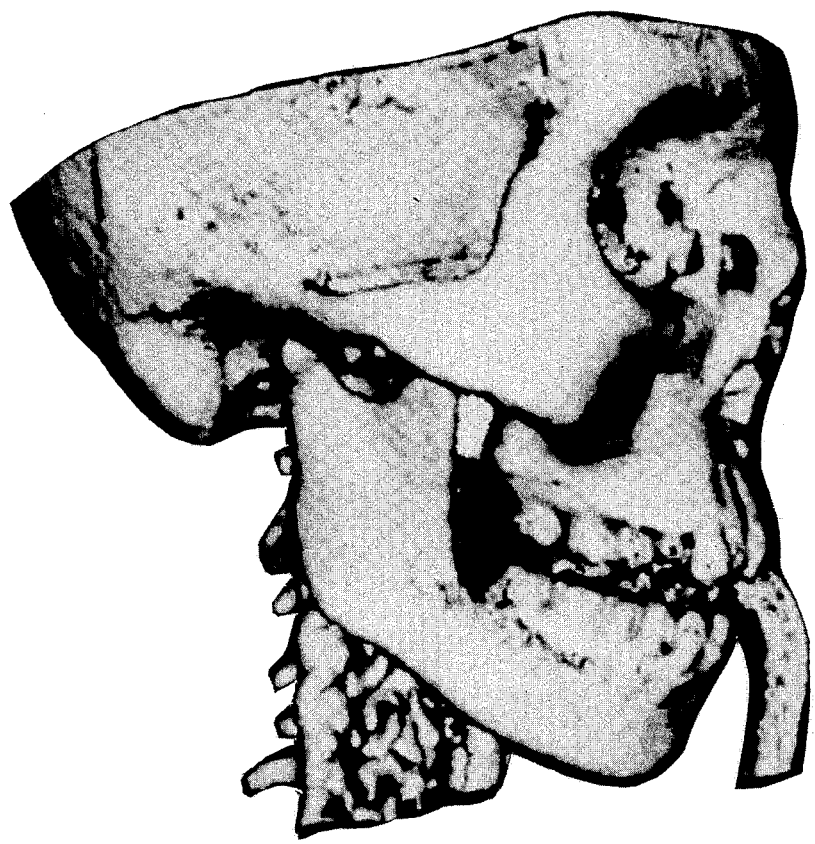
FIG. 11 is a photograph of a CRT image of the side view of the same skull as shown in FIG. 10, this image being generated from the same data as FIG. 10.
Figure 12:
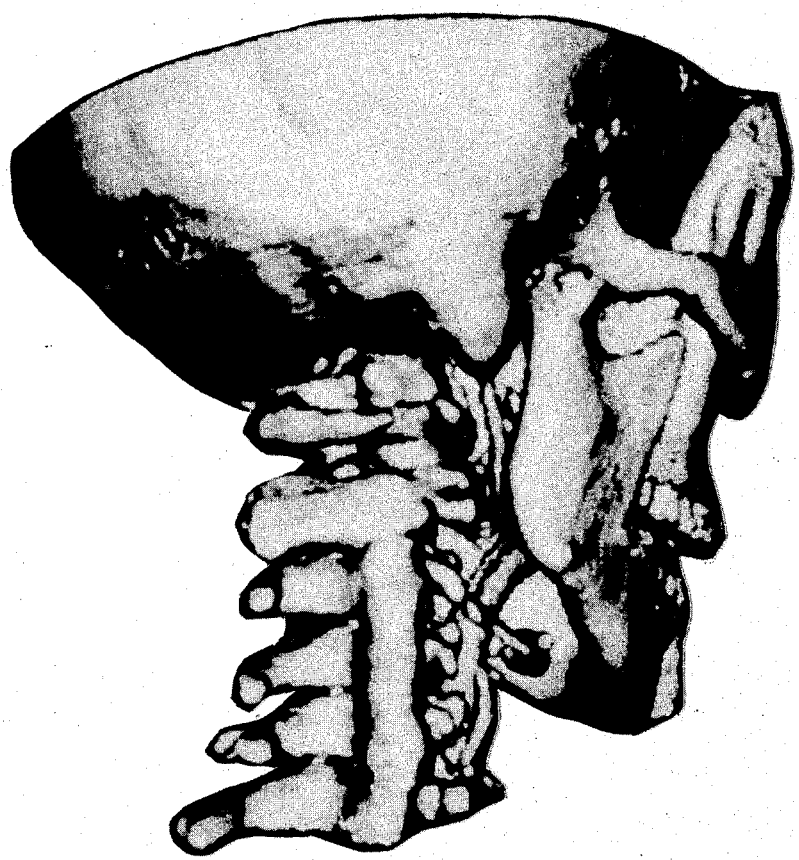
FIG. 12 is a photograph of a CRT display screen image of the skull shown in FIGS. 10 and 11, viewed from a more rearward position.

The benefits accorded the practice of medicine by the present invention are readily apparent in FIGS. 10, 11, and 12. It is important to bear in mind that these three figures represent medical images derived from a living human being. No invasive methods were employed to generate these images. It is also noted that all of these images were generated from the same set of data acquired at a single time. The appearance of the removal of the top of the cranium is only a result of data selection. In fact, by merely removing selected segments of data from the three dimensional data set, cross sectional views of saggital, transverse, or coronal sections are easily generated. Other views are equally possible simply by performing a rotation operation prior to data selection. This is easily controlled by selecting the view direction. In FIGS. 10-12 it is also seen that the subject has been fitted with an endotrachial tube. The arch of this tube is readily apparent in all of the views and it is particularly interesting to note its appearance and position in FIG. 12. In the subject being studied, it is seen that there is a bone defect at the base of the left eye between the nose and the eye. Views of this defect are also obtainable from the back, through any selected plane and at any desired viewing angle. Thus, a diagnostician or surgeon is readily capable of viewing the exact structure that a corrective procedure would encounter. Additionally, the medical practitioner is given a view with excellent three dimensional clues which are provided by the shading produced in accordance with the present invention. It is the determination of appropriate normal directions which permits such enhanced shading features to be provided in medical images.

It is noted that many of the functions performed by the various parts of the system illustrated in FIG. 9 may in fact be performed through the use of one or more general or special purpose digital computation systems.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A system for displaying three dimensional surface structures comprising:
    means for storing three dimensional signal patterns representing the value of at least one physical property associated with a three dimensional body at regularly spaced grid locations within said body;
    means for retrieving the eight three dimensional signal pattern values associated with each set of cubically adjacent grid locations within said body;
    means for comparing each set of said eight values with a predetermined threshold value to generate an eight bit binary vector each of whose elements is zero or one, based on the result of said comparison;
    means for generating a set of coordinate values for each distinct binary vector, said coordinate values representing the vertices of at least one predetermined polygonal surface which approximates the intersection of surfaces determined by said threshold value with the volume defined by said eight grid points, said coordinate values also being dependent on the location of said eight grid locations within said body;
    display processor means for receiving said coordinate values and for converting said coordinate values to a display format; and
    means for displaying surfaces determined by said threshold, said display means being driven by said display processor.

2. The system of claim 1 in which said means for generating said coordinate values includes a read only memory addressed by said eight bit vector.

3. The system of claim 1 in which said display processor means includes means for hidden line removal.

4. The system of claim 1 in which said display format is vector based.

5. The system of claim 1 in which said display format is raster based.

6. The system of claim 5 in which said raster based format provides a shaded display region for each visible polygon in response to the normal direction associated with said polygon in three dimensional space in further response to a selected viewing angle.

7. The system of claim 1 in which said physical property is the x-ray absorption characteristic throughout said body.

8. The system of claim 1 in which said physical property is the nuclear spin density throughout said body as provided by nuclear magnetic resonance imaging devices.

9. The system of claim 1 in combination with a computed tomography x-ray scanner for supplying three dimensional signal patterns representing x-ray absorption, for storage in said storage means.

10. The system of claim 1 in combination with a nuclear magnetic resonance imaging system for providing three dimensional signal patterns representing nuclear spin density, for storage in said storage means.

11. The system of claim 1 further including interpolation means receiving said eight three dimensional signal pattern values and said associated coordinate values and operating to adjust the values of said coordinate values in response to weight values dependent on said eight signal pattern values so as to provide linear interpolation along the edges of the voxel elements defined by said eight grid locations.

12. The preprocessor of claim 11 in which said means for storage, retrieval and comparison comprises a digital computer.

13. A preprocessor for a display system for three dimensional images, said preprocessor comprising:
   means for storing three dimensional signal patterns representing the value of at least one physical property associated with a three dimensional body at regularly spaced grid locations within said body;
   means for retrieving the eight three dimensional signal pattern values associated with each set of cubically adjacent grid locations within said body;
   means for comparing each set of said eight values with a predetermined threshold value to generate an eight bit binary vector each of whose elements is zero or one, based on the result of said comparison; and
   means for generating a set of coordinate values for each distinct binary vector, said coordinate values representing the vertices of at least one predetermined polygonal surface which approximates the intersection of surfaces determined by said threshold value with the volume defined by said eight grid points, said coordinate values also being dependent on the location of said eight grid locations within said body.

14. A method for producing, on a display device, three dimensional surface representations, said method comprising the steps of:
   generating three dimensional signal patterns, said signal patterns representing the values of at least one physical property associated with a three dimensional body at regularly spaced grid locations within said body;
   generating an eight bit vector for each set of eight cubically adjacent locations throughout said body, said locations corresponding to said regularly spaced grid locations, said vector being determined by comparison of said physical property representational values with a predetermined threshold value;
   generating a set of coordinate values in response to each distinct eight bit vector and said eight grid locations, said coordinate values representing vertices of at least one predetermined polygonal surface which approximates the intersection of surfaces determined by said threshold value with the volume defined by said eight grid locations, said coordinate values also being dependent upon the location of said grid locations within said body; and
   supplying said coordinate values to a display processor and display device for generation of an image representative of at least one surface within said body, said surface being determined by said threshold value.

15. A system for displaying three dimensional surface structures comprising:
   means for storing three dimensional signal patterns representing the value of at least one physical property associated with a three dimensional body at regularly spaced grid locations within said body;
   means for retrieving the three dimensional signal patterns values associated with said grid within said body;
   means for comparing the set of said signal patterns with a predetermined threshhold value;
   means for tesselating the output of said comparison, said tesselation means generating polygonal surfaces which approximate the intersection of surfaces determined by said threshhold value with voxel elements defined by said grid, said polygonal surfaces having surface normals substantially different from the three major axes of the grid;
   display processor means for receiving tesselated output and for converting said output to a display format; and
   means for displaying surfaces determined by said threshhold, said display means being driven by said display processor.

16. The system of claim 14 in which said tesselation means includes
   means for comparing each set of eight values associated with cubically adjacent grid points, with a predetermined threshhold value to generate an eight bit binary vector each of whose elements is zero or one, based on the result of said comparison;
   means for generating a set of coordinate values for each distinct binary vector, said coordinate values representing the vertices of at least one predetermined polygonal surface which approximates the intersection of surfaces determined by said threshhold value with the volume defined by said eight grid points, said coordinate values also being dependent on the location of said eight grid locations within said body.

* * * * *